United States Patent [19]

Feinerman et al.

[11] 4,427,276

[45] Jan. 24, 1984

[54] MICROCOMPUTER CONTROLLED PHOTOGRAPHIC EXPOSURE SYSTEM AND METHOD

[75] Inventors: Alan D. Feinerman, Cambridge; Donald L. Grimes, Milford; Kathy J. Messina, East Boston, all of Mass.

[73] Assignee: Polaroid Corporation, Cambridge, Mass.

[21] Appl. No.: 305,690

[22] Filed: Sep. 25, 1981

[51] Int. Cl.³ .............................................. G03B 7/097
[52] U.S. Cl. ................................ 354/412; 354/149.1; 354/413
[58] Field of Search ............................ 354/27, 33, 149

[56] References Cited

U.S. PATENT DOCUMENTS

| Re. 31,034 | 9/1982 | Biber et al. | 354/27 |
| 4,329,031 | 5/1982 | Carcia et al. | 354/33 |
| 4,354,748 | 10/1982 | Grimes et al. | 354/33 |
| 4,367,932 | 1/1983 | Ishikawa | 354/27 |

FOREIGN PATENT DOCUMENTS 56-114937  9/1981  Japan ..................................... 354/33

Primary Examiner—Russell E. Adams
Attorney, Agent, or Firm—John S. Vale

[57] ABSTRACT

A microcomputer is employed in an automatic exposure control system for developing and controlling execution of film exposure strategies for both ambient light exposures and flash and fill flash exposures wherein the scene is illuminated with a mixture of ambient light and artificial illumination provided by a photoflash lamp which may have light output characteristics that deviate from specification due to manufacturing variances. Using pre-exposure scene brightness and distance inputs the computer selects an appropriate one of a plurality of different preprogrammed trajectory signal programs which is to be fed to a stepper motor that drives a shutter blade mechanism in a manner whereby its operation is characterized by an aperture size versus time trajectory curve defined by the selected program. During the course of an exposure interval scene brightness level, including the flash contribution is monitored and is fed back to the computer which is programmed to regulate the provision of trajectory signals to the stepper motor so as to adjust the trajectory curve for optimum exposure in a manner that compensates for variations in the output characteristics of the photoflash lamp.

27 Claims, 10 Drawing Figures

MICROCOMPUTER CONTROLLED PHOTOGRAPHIC EXPOSURE SYSTEM AND METHOD

BACKGROUND OF THE INVENTION

The present invention relates to the field of photography and, more specifically, to automatic exposure control systems and methods usable in cameras for regulating the transmission of image-forming light rays from a scene to the camera film plane and configured for both ambient mode operation for making exposures when the scene to be photographed is illuminated by constant intensity natural available light, and a flash and fill flash mode of operation when scene illumination comprises varying proportional mixtures of ambient light and the transient light output from a combustible filament photoflash lamp.

Of particular interest are those exposure control systems that employ a dynamic aperture or scanning shutter operated under the control of a photoelectric circuit that measures and integrates scene brightness level and provides a trigger signal at a predetermined percentage of optimum exposure value to initiate the shutter closing phase of the film exposure cycle.

Typically, such dynamic aperture shutters include a multi blade mechanism that is displaceable between a light blocking first arrangement where the exposure aperture is closed and a second arrangement where the blades cooperate to define a maximum available exposure aperture. As the blade open, the area of the exposure aperture progressively increases until a peak aperture is reached and then the direction of blade displacement is reversed causing the exposure aperture area to progressively decrease until it closes to terminate the exposure interval. The peak aperture is the largest aperture opening that is achieved during the course of an exposure interval and it may be smaller than the maximum available aperture. For ambient mode operation, the peak aperture generally is correlated to scene brightness level. For flash mode operation, peak aperture typically is selected in accordance with both camera-to-scene distance and brightness inputs.

The operation of the blade mechanism may be graphically depicted by plotting an aperture size (area) versus time (exposure interval) trajectory curve which provides both quantitative and qualitative information about the nature of the film exposure. When the scene brightness level is known, the integrated area under the trajectory curve is indicative of the total amount of light (exposure value) that reaches the film plane. The general shape of the curve characterizes the exposure in terms of depth of field and motion stopping ability. For example, one trajectory curve may have a shutter opening portion that rises quickly to a relatively large peak aperture followed by a similar shutter closing portion. The exposure interval will be relatively short, providing good motion stopping ability, but depth of field will suffer somewhat because of the relatively large effective or average exposure aperture. For the same scene lighting conditions and exposure value, the shutter may be operated in a different manner so that the trajectory rises more slowly to a lower peak aperture, for good depth of field, but the exposure interval will have to be increased accordingly so motion stopping ability will suffer. The shape of a trajectory suitable for general picture taking situations will fall somewhere between these two exremes in an attempt to effect a balance between the depth of field and motion stopping ability parameters.

During ambient mode operation, the light detection and integration circuit monitors scene brightness level as the blades open and provides a signal at a predetermined percentage of optimum exposure value to trigger the blade closing phase. Because of inertial characteristics of the blade mechanism and its associated drive system, it is impossible to achieve instant blade closure so there will be some finite time between the provision of the trigger signal and movement of the blade mechanism to its fully closed position during which the exposure will continue. If the blade mechanism has not reached the maximum exposure aperture defining position where the blades are at rest when the trigger signal is provided, it will also take some time for blade deceleration and reversal of the drive direction. In other words, there will be some overshoot time which also must be accounted for to achieve total control over the exposure process.

If the operating characteristics of the shutter system are well defined and are repeatable, the general shape and area bounded by the portion of the trajectory curve that occurs after the provision of the trigger signal may be accurately predicated or anticipated. Because the scene brightness level is essentially constant over the entire course of the exposure interval for ambient exposures, the additional exposure that will occur after the trigger signal may be accurately predicated. Therefore, for ambient mode operation, there is no problem in providing the trigger signal at a predetermined percentage of optimum exposure value in anticipation that the remaining exposure will take place during the deceleration, blade reversal and shutter closing phase.

However, during flash mode operation, the scene is illuminated with a mixture of constant level ambient light and a transient burst or pulse of light provided by an artificial source of illumination such as an electronic strobe unit or photoflash lamp. The light output characteristics of a strobe unit generally are highly predictable and quenchable type units can be controlled with great accuracy. Also the light pulse is of very short duration compared to the total exposure interval and it can be fired at any selected point along the trajectory curve so that its occurrence coincides with a particular aperture or small range of apertures which are correlated to camera-to-scene distance. Therefore, this very predictable and controllable source of light presents no great difficulty in anticipating its effect on the exposure even when it occurs or persists into the anticipatory portion of the exposure that takes place after the provision of the trigger signal.

On the other hand, a combustible filament photoflash lamp provides a transitory light output over a relatively long time period and its output cannot be controlled or quenched after it has been fired. The light output characteristics of such photoflash lamps are specified by time-intensity performance or burn curves provided by the lamp manufacturers. Following the provision of an electrical flash fire signal, a fine filament is heated to ignite a primer which in turn ignites a wire or foil filament that produces the light output. Following foil ignition, the light intensity builds up to a peak level and then decays.

Tests have shown that the photoflash lamp performance curves are at best a guide to its actual light output characteristics and there is substantial difference in the output characteristics of lamps manufactured to a given specification. Some lamps tend to burn "hot", rapidly rising to peak intensity and then decaying in a shorter time than specified. Other lamps tend to burn "cool" providing its light output over a longer time than specified. In both cases there also may be a substantial deviation in the total amount of light emitted from the lamp during the course of its burn time. For the purposes of this disclosure the terms "hot" and "cool" indicate that the output characteristics deviate from specification and encompass lamps that vary in burn rate and/or total light output.

In the flash mode of operation, the photoflash lamp is employed as the primary source of scene illumination when the ambient light is very low. As the ambient light level increases, the photoflash lamp is used in a fill flash capacity to soften shadows and/or provide additional illumination to dark areas of back or side lighted scenes. Thus, depending on scene lighting conditions, there will be a varying proportional mixture of ambient and flash contribution to the total exposure.

When the ambient light is very low, regulation of the amount of flash light that reaches the film plane is controlled by correlating the taking aperture to subject distance employing well known follow focus techniques. Gradually, the shutter is opened to a subject distance related peak aperture and is held there while the flash is fired to provide the primary source of scene illumination. Because the lamp output generally is decaying when the trigger signal is provided and the ambient light is very low there is very little additional exposure during the shutter closing phase so the "anticipation" effect is minimal. However, in the fill flash mode, the light output from the flash lamp may be quite intense during the shutter closing and, coupled with the high ambient contribution, the exposure that occurs during that period between the trigger signal and the termination of exposure by the shutter reaching its fully closed position will represent a significant portion of the total exposure.

There have been many attempts in the prior art to deal with the anticipation problem when a photoflash lamp is used for flash mode operation. For example, see commonly-assigned U.S. Pat. No. 4,008,481 wherein the trigger level to initiate shutter closing is set lower for the flash mode than the ambient mode in anticipation of the transient addition of scene light intensity caused by the firing of the photoflash lamp. Commonly-assigned U.S. Pat. Nos.

4,023,187 and 4,188,103 describe systems that employ multilevel trigger circuits and scene distance inputs for providing the shutter closing signal at different points in the exposure cycle depending on whether the ambient or flash light is the dominant constituent of scene illumination. Also, see commonly-assigned U.S. Pat. No.4,047,191 for a system that fires the flash lamp in leading relation to the trajectory curve as another way of anticipating the effect of the flash unit on total exposure.

The anticipation problem becomes even more critical for exposure control systems that are adapted for use with the new higher speed color film units (i.e., 400–600 ASA) that have recently become commercially available for use by amateur photographers. With the higher film speed, it is possible to reduce the total exposure interval for given scene lighting conditions, but this means that the anticipated exposure that occurs after the provision of the trigger signal may represent a larger portion of the total exposure and therefore the shutter closing characteristics will have to be very consistent for anticipation purposes.

The above-noted prior art systems tend to be successful in anticipating the flash effect on exposure over the limited range of camera-to-scene distances and ambient light levels provided that the photoflash lamp output follows or is very close to the specified performance curve. However, if the flash lamp output substantially deviates from the specification or the subject to be photographed is at the close or far end of the effective distance range of the system and/or the ambient light level is quite high, the limits to which the anticipatory exposure can be predicted will be exceeded, thereby resulting in either over or underexposed pictures.

Commonly-assigned copending application U.S. Ser. No. 222,562 (now abandoned and replaced by continuing application U.S. Ser. No. 343,160 filled Jan. 27, 1982), filed Jan. 5, 1981, suggests that the exposure appearing after the provision of the trigger signal can be better anticipated if the photoflash lamp is redesigned to alter its output characteristics to provide the same total output but with a lower peak intensity and an extended burn time. While some improvement in exposure control will result, this system still depends on the lamp having a predictable output characteristic and it is not configured to compensate for deviations if the lamp burn is "hot" or "cool".

A common characteristic of the prior art systems is that there is but a single decision point in the exposure process, i.e., the triggering of the shutter closing phase. Once the trigger signal is provided, a commitment has been made to follow a predetermined trajectory curve to exposure termination. If the scene lighting conditions vary from expectation because of variations in the photoflash lamp output, then the anticipated exposure component will be more or less than necessary to reach optimum exposure value.

Because the output from a photoflash lamp is (a) not controllable and (b) not subject to precise prediction, it is apparent that better control over flash exposures can be achieved by reducing the anticipatory portion of the exposure to a minimum.

One approach is to design the shutter blade mechanism and its associated drive system so that it closes as rapidly as possible thereby allowing the trigger signal to be delayed until a relatively high percentage (80–90%) of optimum exposure value has been achieved so that the anticipatory exposure is but a small percentage of total exposure. This approach tailors or optimizes the trajectory curve for photoflash lamp mode operation. However, this type of trajectory will not necessarily be the best type for ambient mode exposures in that it will not necessarily provide the desired balance between motion stopping ability and depth of field.

The above-noted prior art systems have blade drive subsystems that limit the choice of trajectory shape to a single general shape. The blades are driven open by a spring member at a predetermined rate and are closed at a predetermined rate in response to the retraction of a plunger in a solenid that is energized when the trigger signal is provided.

Other prior art systems employ a stepper motor that is driven at a constant rate for moving the blade mechanism at a predetermined velocity between its closed and open positions. For example, see commonly- assigned U.S. Pat. Nos. 3,950,766 and 3,977,012. Again, because the drive rate is unalterable during the course of the exposure process, the system is limited to providing one general trajectory shape.

Thus, the systems have to make a compromise in trajectory choice. If the trajectory is optimized for ambient mode operation, flash mode operation will suffer somewhat in that the shutter closing phase will not be as fast as possible to minimize the anticipatory portion of the total exposure. Conversely, if the trajectory is designed to favor the flash mode performance, the ambient mode performance will not be optimized.

Commonly-assigned copending applications U.S. Ser. No. 216,831 (now U.S. Pat. No. 4,325,614), filed Dec. 16, 1980, and U.S. Ser. No. 275,718 (now U.S. Pat. No. 4,354,748), filed June 22, 1981, disclose an automatic exposure control system wherein the shutter blade mechanism is driven by a stepper motor that is operated under the control of a microcomputer. The microcomputer includes a trajectory data base which it utilizes to develop a plurality of different trajectory signal programs for the stepper motor to define corresponding different trajectory shapes that are tailored for any number of different desired exposure effects. The first-mentioned application discloses the ambient mode of operation and the second discloses a quench strode flash mode which utilizes an expanded data base that includes strobe flash mode trajectory data along with strobe firing and quenching data. The operation of this system in both the ambient and strobe flash modes is amenable to exposure anticipation because the scene lighting conditions are constant for ambient mode operation and highly controllable for strobe flash mode operation.

However, there is a need for an automatic exposure control system that is versatile enough to provide a wide variety of trajectories that are tailored for particular desired exposure effects including optimizing the flash and fill flash mode of operation when a combustible filament photoflash lamp is used as the source of artificial illumination.

Therefore it is an object of the present invention to provide an automatice exposure control system that is operative to reduce the amount of anticipatory exposure content in a flash/fill flash mode when a photoflash lamp is used as the source of the artificial illumination.

It is another object of the invention to provide such a system that has provisions for automatically adjusting the trajectory curve characterizing the operation of its dynamic aperture shutter in response to the actual light output characteristics of the photoflash lamp.

It is yet another object to provide such system which minimizes the anticipatory portion of total exposure thereby allowing the effective distance and ambient light level range over which good flash performance can be expected to be expanded.

Other objects of the invention will, in part, be obvious and will, in part, appear hereinafter.

SUMMARY OF THE INVENTION

The present invention provides an exposure control system usable in a camera for controlling transmission of image-forming light rays from a scene to a film unit located in a film plane. The system is operable in both an ambient light mode and a flash mode wherein the scene is illuminated by a mixture of ambient light and artificial illumination provided by a combustible filament photoflash lamp which when fired may have light output characteristics that differ from its output specifications due to manufacturing variances.

The system includes a blade mechanism mounted for displacement between a first arrangement wherein it blocks transmission of scene light to the film plane and a second arrangement wherein it defines a maximum aperture. The blade mechanism serves to define a range of progressively increasing sized apertures as it moves from its first arrangement toward its second arrangement and then a range of progressively decreasing sized apertures as it returns to its first arrangement during the course of an exposure interval for regulating transmission of scene light to the film plane.

Drive means, responsive to a program of trajectory signals, are provided for driving the blade mechanism in a manner whereby its operation is characterized by an aperture size-versus-time trajectory curve defined by the program of trajectory signals.

The system also includes means for connecting a flash unit to the system for firing a flash lamp; means for selectively setting the system for either ambient light or flash mode operation; input means; and control means.

The input means serve to provide pre-exposure inputs indicative of scene brightness level and camera-to-scene distance; and an exposure brightness input indicative of scene brightness level during the course of an exposure interval.

The control means are operative upon actuation for controlling a cycle of system operation and include a memory section having a pre-programmed trajectory and flash fire data base stored therein.

The data base includes at least characterizing elements of a plurality of different ambient light trajectory signal programs, each correlated to a different range of ambient scene brightness levels; at least characterizing elements of a plurality of different flash mode trajectory signal programs, each correlated to the specified light output characteristics of such a flash lamp and different combinations of ranges of ambient scene brightness levels and camera-to-scene distances; and correlated flash firing time data for each of said flash mode trajectory signal programs.

The control means further includes means responsive to at least the pre-exposure brightness input, when the system is set for ambient light operation, for utilizing the data base and developing therefrom a program of trajectory signals to provide an ambient light trajectory curve appropriate for the indicated scene brightness level, and for feeding the program of trajectory signals to the blade drive mechanism to effect exposure of the film unit.

When the system is set for flash mode operation, the last-mentioned means are responsive to both the pre-exposure brightness and camera-to-scene distance inputs for utilizing the data base and developing therefrom a program of trajectory signals to provide a flash mode illumination trajectory curve appropriate for the indicated brightness and distance; for selecting a flash firing time correlated to the developed program and for feeding at least an initial portion of the program to the drive means and providing a flash fire signal to the flash unit at the selected time to initiate an exposure cycle. Following initiation of the exposure cycle, the last-mentioned means is responsive to the exposure brightness input for regulating a provision of the trajectory program signals to the drive means to adjust the shape of the trajectory curve for optimum exposure value in response to the light output characteristics of the flash lamp thereby providing compensation for deviations from its specified output characteristics.

Rather than depending on a single trigger signal to initiate the shutter closing phase, the exposure brightness input is provided over the entire course of the exposure cycle and the input responsive means effects adjustment of the trajectory curve on a continuous basis. Because of the "real time" adjustment, operation of the blade is actively controlled during a substantial portion of closing phase thereby reducing the amount of anticipated exposure which tends to be difficult to predict because of variations in the light output characteristics from lamp to lamp.

In a preferred embodiment, control means includes a microcomputer and the shutter blade mechanism is driven by a stepper motor. The program of trajectory signals comprises a series of pulse signals that are fed to the stepper motor and the input responsive means effects adjustment of the trajectory curve by regulating the timing at which the pulse signals are sequentially provided to the drive means. In the illustrated embodiment, the flash mode trajectory portion of the data base is preprogrammed with predetermined schedules of percentages of total light required for optimum exposure value for various combinations of scene brightness and camera scene distance. By regulating the timing of the program signals the input responsive means effects holding the blade mechanism at given aperture defining step positions until the predetermined percentage of light required for optimum exposure value has been detected and then provides the next trajectory program signal to advance the motor to its next prescheduled step. In this manner, the closing portion of the trajectory curve is defined by a series of hold and wait steps based on a predetermined schedule of percentages of total light required for optimum exposure. The time that the blade mechanism is held at each step is determined by the actual light output characteristics of the particular lamp used to make the exposure.

That is, the general slop of the closing portion of the trajector curve is adjusted in accordance with the light output or burn characteristics of the flash bulb. If the bulb burns "hot", the closing slope will be fairly steep thereby making the exposure interval shorter than it would have been if the flash bulb provided its specified output. When the system detects that the lamp is of the "cool" burning type, the general slope of the closing portion is shallower to extend the exposure interval accordingly.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
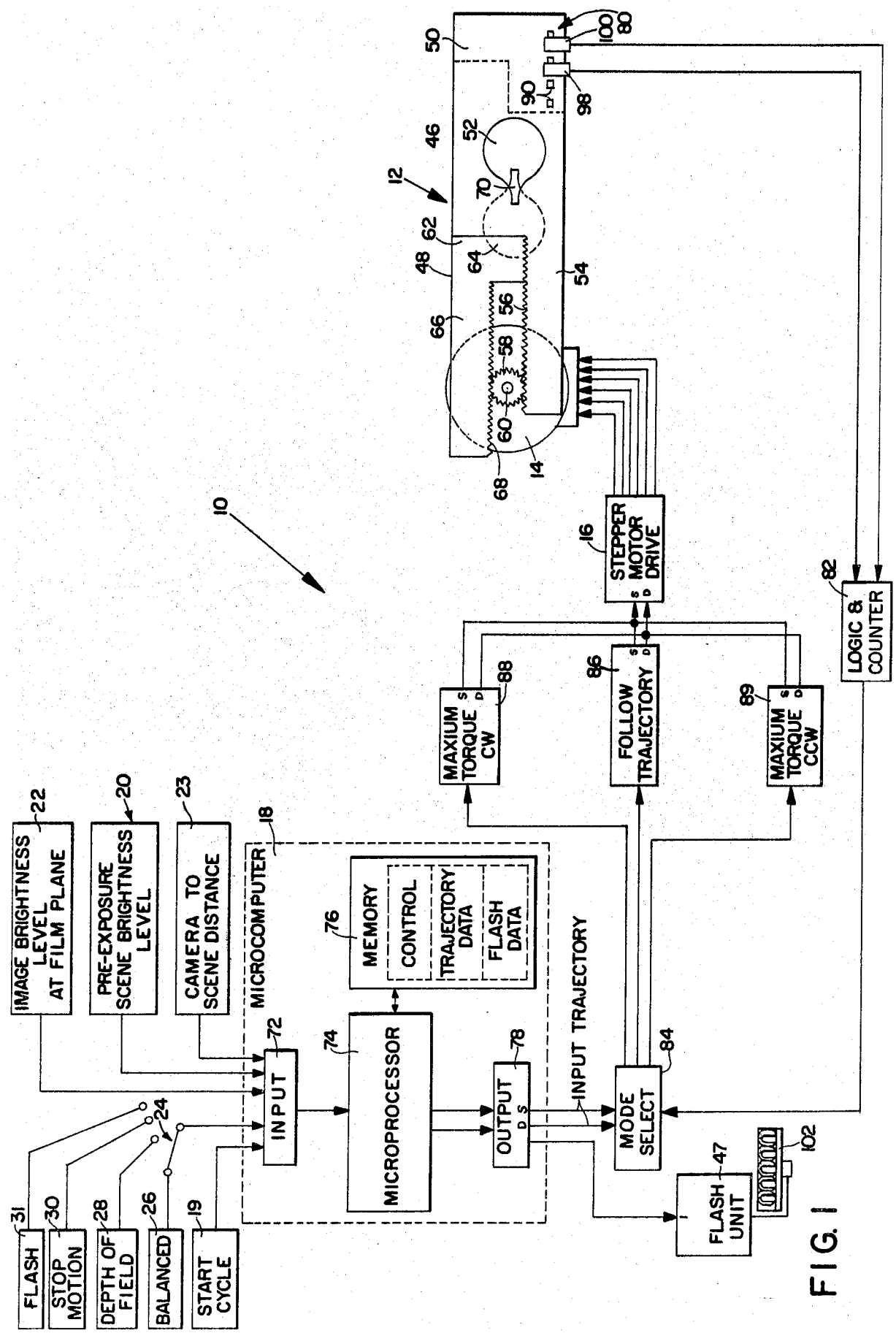
FIG. 1 is a block diagram showing an automatic exposure control system embodying the present invention.

An automatic exposure control system 10 incorporating the present invention is shown in block diagram form in FIG. 1.

System 10 includes a dynamic aperture scanning shutter blade mechanism 12 which is configured to be driven by areversible stepper motor 14 operated, in a closed loop manner by a stepper motor drive circuit 16 (and later-to-be-described position feedback control loop and drive mode selection system) under the control of a microcomputer 18. The operation of a microcomputer 18 is, in turn, responsive to a plurality of inputs. These include a cycle start input 19 provided in response to the operator manually actuating an exposure cycle start button and automtically provided inputs such as a pre-exposure scene ambient brightness level, designated 20, an image brightness level at the film plane, measured during the course of an exposure interval, designated 22, and a camera-to-scene distance input, designated 23, which is preferably provided by a sonar ranging and lens focusing system which may be of the type disclosed in commonly-assigned U.S. Pat. No. 4,081,626. Additional inputs may be provided manually by the operator. For example, the operator may set a four-position switch 24 to select a normal or balanced mode 26, a depth-of-field emphasizing mode 28, a motion stopping emphasizing mode 30, or a supplemental illumination or flash mode 31 employing a photoflash lamp. If the flash lamp firing unit is not permanently attached to the system, switching to the flash mode may take place automatically in response to operatively connecting this unit to system 10.

As will become more apparent later, in the balance mode, the microcomputer 18 utlizes a trajectory program data base appropriate for general ambient light photography whereby blade mechanism 12 is operated in a manner that is balanced or optimized for the best compromise between depth of field and motion stopping ability. The selection of either the depth of field or stop motion modes overrides the provision of the general photography program and substitutes therefor appropriate trajectory programs which emphasize the selected characteristics, i.e., effective aperture or exposure interval. In the flash mode, the computer 18 utilizes a flash mode trajectory program and a flash firing data base for developing a flash mode trajectory program and selecting a corresponding flash firing time appropriate for the indicated ambient brightness level and camera to scene distance.

Figure 2:
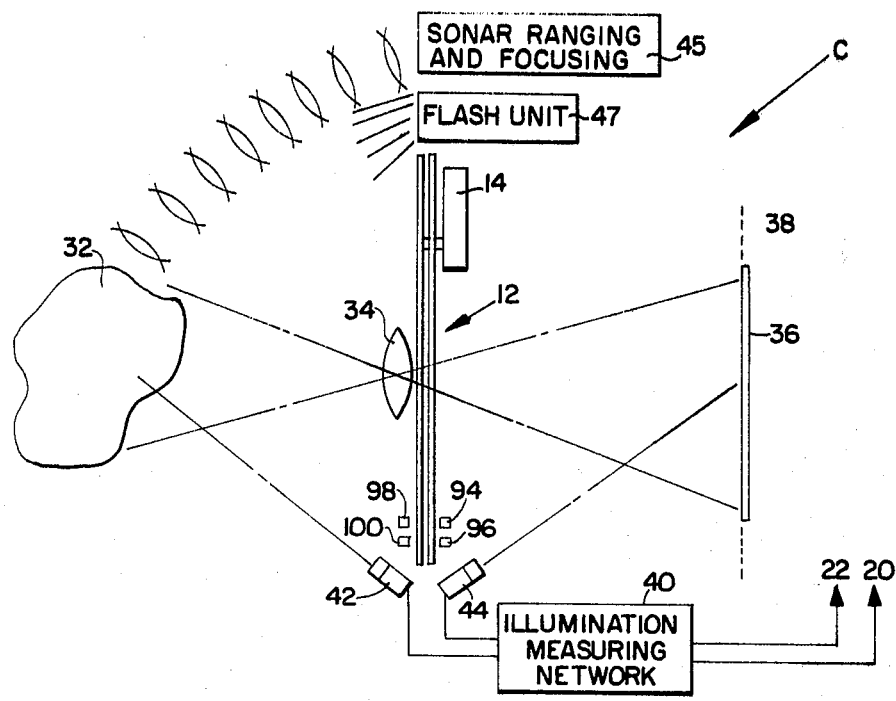
FIG. 2 is a diagrammatic top view of selected components of a photographic apparatus incorporating said exposure control system.

As shown diagrammatically in FIG. 2, the exposure control system 10 is intended for use in photographic apparatus, such as a camera C or the like, for controlling the transmission of image forming light rays of a scene 32 provided by objective lens 34 to a film unit 36 located at the camera's film plane 38. System 10 also includes an illumination measuring network 40 which utilizes a first photocell 42 mounted on the camera to receive the light from a selected portion of the field of view of lens 34 and providing the pre-exposure scene brightness level input 20 and a second photocell 44 mounted on the interior of the camera for receiving light from the image formed at the film plane on a film unit 36 for providing input 22 to the microcomputer 18. Alternatively, a measure of scene brightness may be obtained by using a single photocell directed toward the scene through appropriate aperture shapes associated with the blade mechanism to provide both the pre-exposure input 20 and then the exposure brightness input 22 during the course of the exposure interval. The camera-to-scene distance input 23 is provided by a sonar ranging and focusing system 45. Also shown is a flash unit 47 for receiving and firing a combustible filament photoflash lamp, thereby providing a source of artificial illumination directed toward the scene 32. Flash unit 47 may be of the type that accepts a single flash lamp but, in a preferred embodiment is adapted to receive a flash bar (multilamp array) and automatically fire the lamps in sequence.

It will be understood that within the context of this disclosure the term "brightness" or "brightness level" is intended to mean the illumination level of the scene or image at the film plane as it is commonly measured in the photographic art for determining proper film exposure value.

Returning to FIG. 1, blade mechanism 12 is of the integrated type that performs both the effective aperture and exposure interval defining functions. In the illustrated embodiment, blade mechanism 12 comprises a pair of thin, elongated blade members 46 and 48 mounted by means (not shown) in superposed relation for simultaneous reciprocal displacement in opposite directions, in response to rotation of stepper motor 14, between positions blocking and unblocking the transmission of image forming light to the film plane 38.

The forwardmost blade member 46 includes a generally rectangular major section 50 having a longitudinally tapered opening 52 therein; and an integrally formed elongated drive arm 54 extending laterally (to the left) from the lower left-hand end of major section 50 and including on the upper horizontal edge thereof an integrally formed toothed rack 56 that is in mesh with the underside of a drive pinoin 58 fixedly secured to the drive shaft 60 of stepper motor 14.

The rear blade 48 includes a major section 62 having a complementary tapered opening 64 therein; and an integrally formed upper drive arm 66 having a toothed rack 68 on its lower horizontal edge in mesh with the top side of drive pinion 58.

In response to a counterclockwise rotation of motor 14 gear 58 will drive forward blade member 46 to the right and simultaneously drive blade member 48 to the left so that openings 52 and 64 will be completely out of registration with their narrow tapered ends in facing relation to define the closed or light-blocking position of blade mechanism 12. In response to clockwise rotation of motor 14, the blades are driven in the opposite directions so that openings 52 and 64 progressively overlap and cooperate to define an exposure aperture 70 that is centered on the optical axis of objective lens 34. As blade members 46 and 48 move away from the closed position, exposure aperture 70 becomes progressively larger until it defines a maximum obtainable aperture wherein the major portions of openings 52 and 64 are in full registration. As the blade members 46 and 48 are driven back toward the closed position, exposure aperture 70 progressively decreases in size (area) until it closes.

The change in size of the exposure aperture 70 with each incremental step of the blade mechanism 12 will, of course, depend on the selected shape for the openings 52 and 64. It should be understood that it is within the scope of the present invention to use openings 52 and 64 that provide either linear or nonlinear rates of changes in exposure aperture size as a function of blade displacement and that the particular shape of the openings 52 and 64 shown in FIG. 1 are by way of illustration only.

Figure 3:
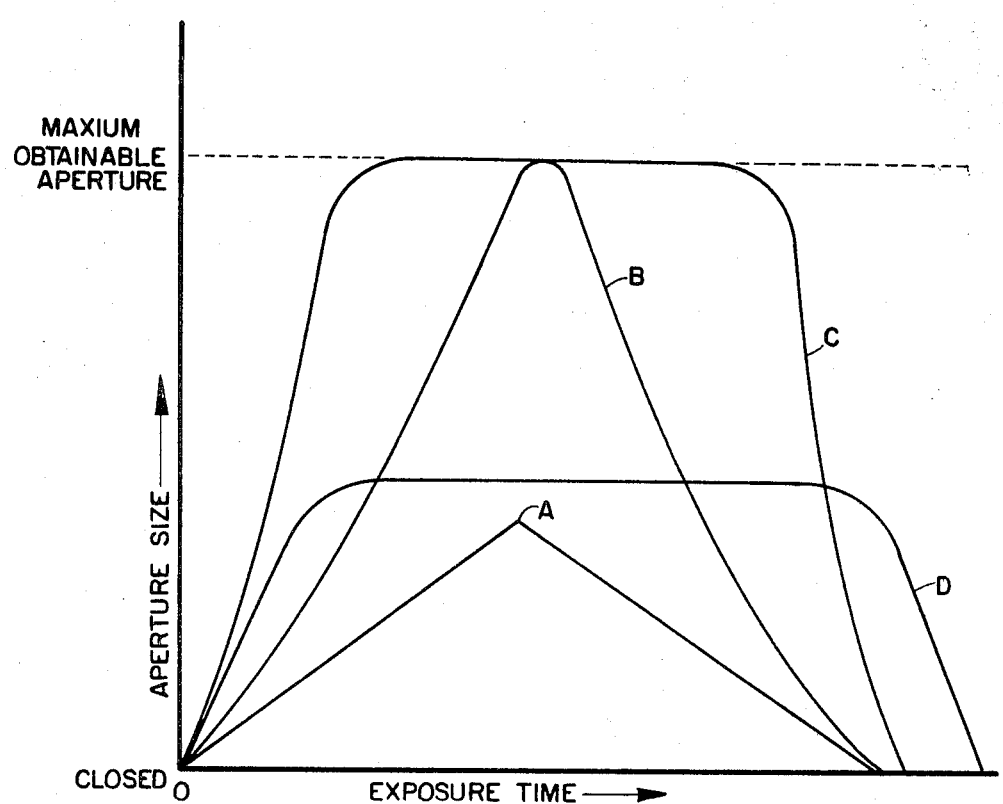
FIG. 3 is a graph showing a variety of different shaped aperture size versus exposure time trajectory curves.

With reference to FIG. 3, the operation of blade mechanism 12 and the nature of the resultant exposure may be characterized by an aperture size or area (Y-axis) versus exposure time or interval (X-axis) trajectory curve. The area under the trajectory curve is indicative of the total quantity of ambient image light of known intensity that impinges upon the film unit. The shape of the curve, however, defines the average or effective aperture and exposure interval and is therefore indicative of depth of field and motion stopping ability.

In terms of photographic performance, the versatility of a scanning shutter mechanism can be rated on its ability, or lack thereof, to generate a variety of different trajectory curves utilizing the largest possible portion of the plotting area. There are, of course, some practical limitations to full utilization of the plotting area in that mechanical shutters and their drive systems inherently have mass and inertial characteristics that preclude instantaneous blade movement from one position to another. But, in generl, a blade mechanism that can be driven in a controlled manner at a relatively fast maximum rate will be more versatile than a shutter that has a lower rate limit.

Let's assume that the apertures 52 and 64 in blade mechanism 12 are designed so that exposure aperture 70 increases in size linearly as a function of blade displacement.

If the drive system for stepper motor 14 can operate only at a fixed rate, as is common in many stepper motor shutters known in the prior art, then the variety of trajectory curves that can be generated is severely limited. For example, trajectory curve A is triangular in shape and indicates that the aperture increases at a fixed rate to a peak aperture and then decreases at the same rate unti the shutter closes. Because the rate of blade displacement is fixed, the slope of the opening and closing portions of the trajectory cannot be changed. If exposure interval is increased, the size of the peak aperture increases accordingly. The trajectory shape can be changed somewhat, however, by stopping blade displacement at a given peak aperture for a given time before closing so that the trajectory has a truncated shape. Versatility is still quite low because the trajectories are constrained to a family of curves that have fixed slopes in their opening and closing sections.

The performance versatility of blade mechanism 12 can be increased substantially by providing a drive system wherein the rate at which stepper motor 14 is driven can be changed. For example, to photograph a very bright scene, it may be desirable to open the blades slowly (shallow slope) to a relatively small peak aperture and then close the blades at the same rate. The high brightness level will keep the exposure interval short (good motion stopping ability) while the relatively small effective aperture will insure good depth of field.

If one wishes to photograph a scene that is less bright but yet maintain the same exposure interval, the blade mechanism 12 should be driven at a faster rate so that it reaches larger peak and effective apertures during the course of the exposure interval. Under the same scene lighting conditions, a variable drive rate shutter will also allow a choice of trajectory curve shapes to emphasize different exposure parameters. Obviously, then, a shutter in which the rate of blade displacement can be changed for different exposures has increased versatility.

By the same token, if the rate of blade displacement can also be changed during the exposure interval to provide blade acceleration or deceleration, then the trajectory curves are no longer limited to having linear opening and closing portions and versatility is once again increased. For example, curve B shows a generally triangular trajectory that has sagging or approximately parabolic sides which under current thinking tends to be the best balanced compromise between depth of field and motor stopping. For this exposure, the blade mechanism opens to the maximum aperture and then closes in the same manner so that the closing section of the trajectory is a mirror image to the opening section. Trajectory C is indicative of an exposure where the blades open at a much faster rate to the maximum aperture where it is maintained for a period of time before it closes. Trajectory D indicates that the blades open at some intermediate rate to a peak aperture, well below maximum aperture, where it is held for a period of time before it is closed. Thus, if the motor drive system can operate at different rates, and provide blade acceleration and deceleration during exposure, then the scanning shutter system will be highly versatile in that a greater number of different shaped trajectories may be generated to best accommodate a variety of photographic situtions.

A stepper motor drive system was chosen for exposure control system 10 because it can be accelerated and decelerated in a controlled manner during the course of a typical exposure interval to generate a large number of different trajectory curve shapes and it is also compact and relatively inexpensive considering its intended function.

A stepper motor suitable for use in exposure control system 10 typically has a permanent magnet rotor with four coil unipolar or bifilar windings. In the illustrated embodiment, the blades 46 and 48 are typically displaced one-half inch between the closed and maximum aperture defining positions. A 24-step/revolution motor (15°/step) may be operated in a half-step mode (48-steps/revolution) and drive the blades 46 and 48 between the closed and maximum aperture defining position with 180° rotation, i.e., 24 steps (7.5°/step). For best acceleration characteristics, the holding torque-to-inertia (rotor plus load) ratio should be as large as possible. Those having skill in the stepper motor art will appreciate that motor 14 may be operated in the half step mode simply by changing the pattern of coiled energization so that on an alternating basis, either one or two coils at a time are energized to effect stepping.

The stepper motor drive circuit 16 is responsive to pulse inputs (direction of rotation at terminal D and stepping sequence at terminal S) for effecting the correct sequence of coil energizations to control the rate and direction of motor drive. Such drive circuits are well known in the art and need not be described further here to understand the present invention.

Trajectory input from microcomputer 18 comprises a program of trajectory signals for controlling the rate and direction of rotation of motor 14 so that blade mechanism 12 operates in a manner characterized by a corresponding trajectory curve. The trajectory program includes appropriate clockwise and counterclockwise rotation signals that are ultimately fed to terminal D of circuit 16 and a series of motor stepping pulse signals which are fed to terminal S for controlling the angular relation between the rotor and stator magnetic fields to effect operation of stepper motor 14.

The microcomputer 18 comprises an input device or buffer 72 for feeding the previously noted inputs in appropriately encoded form to a microprocessor or central processing unit 74. Microprocessor 74 interacts with a preprogrammed read only memory (ROM) 76 which has separate sections for storing the control program defining the computer's operating instructions; a trajectory data base which microprocessor 74 will utilize to develop a plurality of different trajectory signal programs, appropriate for both ambient light and flash operation, in response to the different inputs; and a flash operating data base which will be used in conjunction with scene brightness level and range inputs to select an appropriate flash lamp firing time. The output from microprocessor 74 is fed through an output device or buffer 78 to the motor drive system and flash unit 47.

While the stepper motor 14 could be driven in an open loop manner, the performance level of the system is enhanced by adding a position feedback control loop.

This control loop includes a blade displacement encoder system 80 for monitoring the stepwise position of blade member 46 during the course of an exposure interval; a logic and counter network 82 for receiving pulse signals from encoder system 80 and providing a displacement output signal indicative of the stepwise position of blade member 46; and a mode select network 84 for receiving and commparing the input trajectory signal with the displacement signal and providing to stepper motor drive circuit 16 either a follow trajectory input 86 comprising the original input trajectory signal from microcomputer 18 when the blade member 46 is in the correct position for the planned trajectory or, when there is large enough variance between the displacement output and the trajectory output, a corrective signal program which switches the stepper motor to a maximum torque mode of operation via the provision of either maximum torque-clockwise or maximum torque-counterclockwise input, designated 88 and 89 respectively.

In the illustrated embodiment, the encoder system 80 is an optical two quadrature track encoder that senses the position of blade member 46 throughout the exposure interval. The encoder system comprises a longitudinally extending array of vertical slits 90 in blade member 46, a pair of light emitting diodes (LEDs) 94 and 96 (see FIG. 2) positioned behind slits 90 and a corresponding pair of aligned photosensitive detectors or photocells 98 and 100 located on the forward side of the blade member 46 in front of slits 90 and in alignment with the LEDs. In response to movement of blade member 46, the slits 90 and the intervening opaque segments therebetween sequentially unblock and block transmission of light from the LEDs to the corresponding photocell detectors 98 and 100 to produce a digitally encoded output therefrom in a well-known manner.

The outputs from detectors 98 and 100 are fed to network 82 which includes a logic circuit for decoding directional information and a counter for counting each step of blade displacement. Typically, the count is set at 0 when the blades are at the initial position several steps beyond the closed position to insure the apertures are fully out of registration for light sealing purposes and the count increases as the blades move in the opening direction and decreases in response to a direction change signal when the blades reverse direction.

The mode select network 84 is a logic subsystem which compares the blade displacement output or count from network 82 with the direction and stepping pulse input trajectory signals (D and S) provided by microcomputer 18. If there is correlation, indicating that the blade member 46 is in the correct position to follow the planned trajectory, then network 84 operates in its normal follow trajectory mode (input 86) and continues to supply the original trajectory signal program from microcomputer 18 to the stepper motor drive circuit 16. However, if the signal comparison indicates that blade member 46 is either ahead of or its lagging behind the correct position too much, network 84 automatically switches to a maximum torque mode of operation and provides a corrective signal program to operate the stepper motor drive circuit 16 in a maximum torque mode. The corrective signal program comprises the provision of appropriate maximum torque directional and stepping pulse inputs 88 or 89 to either accelerate or decelerate motor 14 and thereby move the blade mechanism 12 toward the correct position. Such corrective action will continue until the feedback count from network 82 indicates that the blade mechanism 12 is at its correct position to generate the planned trajectory at which point network 84 automatically switches back to the follow trajectory mode resuming the provision of input 86.

For a more detailed description of the position feedback control loop and the mode select system along with the various components and subsystems forming parts thereof, reference may be had to commonly-assigned copending application U.S. Ser. No. 216,831, filed on Dec. 16, 1980 by Donald L. Grimes and entitled "Exposure Control System With Shutter Operation Controlled By A Microcomputer", said copending application being incorporated by reference herein.

FIG. 1, the major components of microcomputer 18 are shown separately merely to identify their functions. In its actual construction, microcomputer 18 may be formed on a single substrate (computer on a chip) or may comprise a plurality of appropriately interconnected separate large scale integrated circuits.

The use of microcomputer 18 to define and control the operation of the blade mechanism 12 and the flash unit 47 in response to one or more inputs provides a great deal of flexibility in how the exposure control system may be used because selection of the operating characteristics of these components now simply becomes a mater of programming microcomputer 18. Advantageously, the addition of the flash mode capability to the exposure control system may be achieved at relatively low cost in that it can be readily accomplished by using a moderately upgraded version of the microcomputer that is used in the exposure control system used in the previously-noted copending application U.S. Ser. No. 216,831.

Although not shown in the drawings, it should be obvious to those having ordinary skill in the art that computer 18 may be programmed in a more detailed manner to be responsive to additional inputs including those relating to film speed or other characteristics for providing a greater number of different trajectory signal programs. More importantly, perhaps, exposure control system can be periodically updated at the factory by reprogramming microcomputer 18 to take advantage of new ideas in exposure control.

Ambient Mode Operation

As an example of how system 10 functions in the ambient mode when the scene is illuminated by natural light, let's assume that the system is configured as shown in FIGS. 1 and 2 with the mode selection switch 24 in the balanced position to provide input 26. In response to the operator actuating cycle start button 19, illumination measuring circuit 40 and its associated photocell 42 are energized to provide a pre-exposure scene brightness level input 20. The sonar ranging system 45 automatically operates at the same time providing a distance measurement input and setting the lens 34 in the correct focus position. The distance input is not utilized for exposure control purposes during ambient mode operation.

Figure 4:
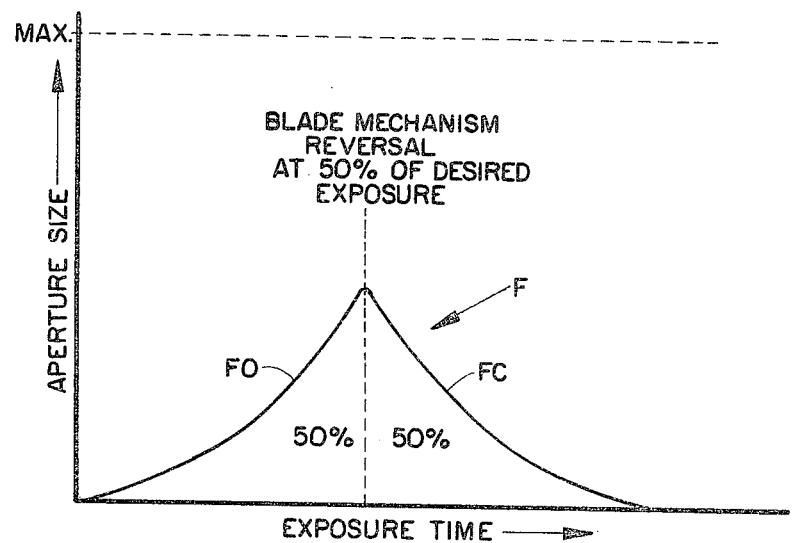
FIG. 4 is a graph showing a typical trajectory curve for balanced ambient mode operation.

Based on the scene brightness level 20, the characteristics or speed of the film used, and the properties of the camera's optical system, it has been determined that proper exposure, balanced for depth of field and motion stopping ability, will be obtained if blade mechanism 12 is operated in a manner characterized by the trajectory curve F shown in FIG. 4.

The opening portion, FO, is approximately parabolic, showing that the rate of change of aperture area starts out slowly and then progressively accelerates until a peak aperture, less than the maximum obtainable aperture, is defined at which point the direction of stepper motor drive is reversed to define the closing section, FC, which is essentially a mirror image of the opening section, FO. The symmetrical nature of F indicates that 50% of the total exposure light impinges upon the film unit 36 during the opening phase and the other 50% during the closing phase. That is, the blades are reversed at 50% of the total desired exposure. A trigger signal to effect blade reversal is provided before peak aperture is achieved in anticipation of further blade opening movement due to inertial characteristics of the shutter system.

Broadly speaking, the trajectory data base section of ROM includes data serving, at least, as characterizing elements of a plurality of different shaped curves. Typically, there will be data for a family of balanced trajectory curves which will vary in the shape of their opening and closing sections for different scene brightness levels. For relatively high brightness levels, the opening and closing slopes will be relatively shallow so that both the peak and average or effective aperture will be relatively small. For lower scene illumination levels, the opening and closing slopes will be steeper indicating that the blades will open more rapidly to a higher peak and effective aperture for asimilar exposure interval to produce the same exposure value. Also, there will be additional data in the trajectory data base defining separate families of trajectories appropriate for depth of field and motion stopping ability emphasizing ambient modes and for the later-to-be-described flash mode.

In response to the various inputs, in this case balanced mode input 26 and scene brightness level input 20, the microprocessor 74, operating under the control of the instructional or control program in ROM 76, will select appropriate data from the balanced family of trajectories and develop therefrom a program of trajectory signals that will cause the stepper motor 14 to drive blade mechanism 12 in a manner characterized by the trajectory curve F.

There are, of course, many ways to program microcomputer 18. For example, the trajectory data base of ROM 76 could be programmed with enough data to define the entire curve F based on the pre-exposure input 20 alone. However, in a preferred embodiment it is programmed only to include data defining the shape of the opening portion of each of the plurality of trajectories for the reasons of programming economy and added flexibility. Additionally, the closed loop of the photocell reduces effects of parameter variations.

Microcomputer 18 initially provides the appropriate program of trajectory signals to effect the driving of blade mechanism 12 from its closed position toward its fully open position along trajectory portion FO. At this point, the illumination measuring circuit 40 and photocell 44 operate in a light integrating mode to monitor the image illumination level at the film plane and provide input 22. When light integration circuit reaches a predetermined level indicating that 50% of the required exposure will be achieved at peak aperture, a trigger signal is provided and the microprocessor 74 changes the program of trajectory signals to reverse the blade drive. The mirror image closing portion FC of the trajectory curve F is generated by reversing the opening trajectory signal program utilized up to the turn around point. That is, a record of the opening section of the trajectory signals is maintained in storage and then is utilized to define the mirror image closing portion of the trajectory.

If the operator wishes to emphasize depth of field or motion stopping ability, he merely changes the setting of selector switch 24 to provide either input 28 or 30. These inputs override selection from the balanced trajectory data and switch selection to the appropriate alternative program.

By appropriately programming microcomputer 18 to vary the rate of blade mechanism displacement, including acceleration or deceleration, during the course of an exposure interval, a wide variety of characterizing trajectory curves may be generated. These may have linear or nonlinear portions, or combinations of both. Also, they may be symmetrical or asymmetrical.

The dynamic response of exposure control system 10 is a major determining factor as to whether or not it can accurately generate a particular trajectory curve characterizing the operation of the blade mechanism 12. More accurate dynamic response is, of course, enhanced significantly by utilization of the positional feedback control loop and mode select system described earlier.

The Flash Subsystem

In response to the pre-exposure scene brightness and distance inputs 20 and 23, the flash subsystem utilizes the trajectory and flash operation data base to develop an appropriate flash mode trajectory signal program and select a correlated flash firing time for providing the desired amount of artificial illumination contribution to exposure value. Generally, when the scene brightness level is relatively low, the flash lamp contribution is relatively high. As scene brightness levels increase, ambient and flash illumination are mixed so that the flash unit primarily serves to provide a fill flash capability.

The flash subsystem is configured to be compatible with and enhance the versatility of those aspects of the exposure control system 10 described up to this point. Advantageously, the cost of adding the flash capability is relatively low in that it only requires the addition of a flash unit connector and a modest expansion of the microcomputer's memory section to accommodate the flash trajectory fire data base and the additional control program for coordinating the firing of flash unit 47 with the operation of blade mechanism 12.

With this approach, integration of the flash capability into the overall exposure control system 10 is reduced to the task of providing microcomputer 18 with the appropriate programming to carry out a desired flash strategy.

During the design phase of a new camera incorporating system 10, different flash techniques can be explored simply by reprogramming. Another advantage is that it is possible to make programming adjustments to "fine tune" the exposure control system to take advantage of selected exposure characteristics of the film and/or to compensate for the dynamic response characteristics of other components in the system. Also, as flash lamp technology improves in the future, these advances may be incorporated into new camera models by reprogramming at the factory.

As will become apparent, the position feedback control loop provides accurate tracking of the selected trajectory curve and allows the flash lamp to be fired at a selected point along that curve, or at some preselected time prior to the initiation of blade opening, with great precision. Unlike many of the other prior art systems wherein the ultimate shape of the trajectory curve is dictated by the provision of a single trigger signal to initiate blade closing, the exposure control system embodying the present invention continuously monitors scene brightness and adjusts the trajectory curve to compensate for variations in the flash output characteristics and, as will become apparent later, thereby substantially reducing the amount of anticipation required.

Exposure control system 10 may be readily designed for use with any type of suitable photoflash lamp. In the illustrated embodiment, the flash unit 47 is configured to receive a flashbar 102, i.e., a ten (10) lamp array of the type disclosed in U.S. Pat. Nos. 3,598,984 and 3,598,985, and fire each lamp in sequence employing a firing circuit of the type disclosed in U.S. Pat. No. 3,676,045.

Figure 5:
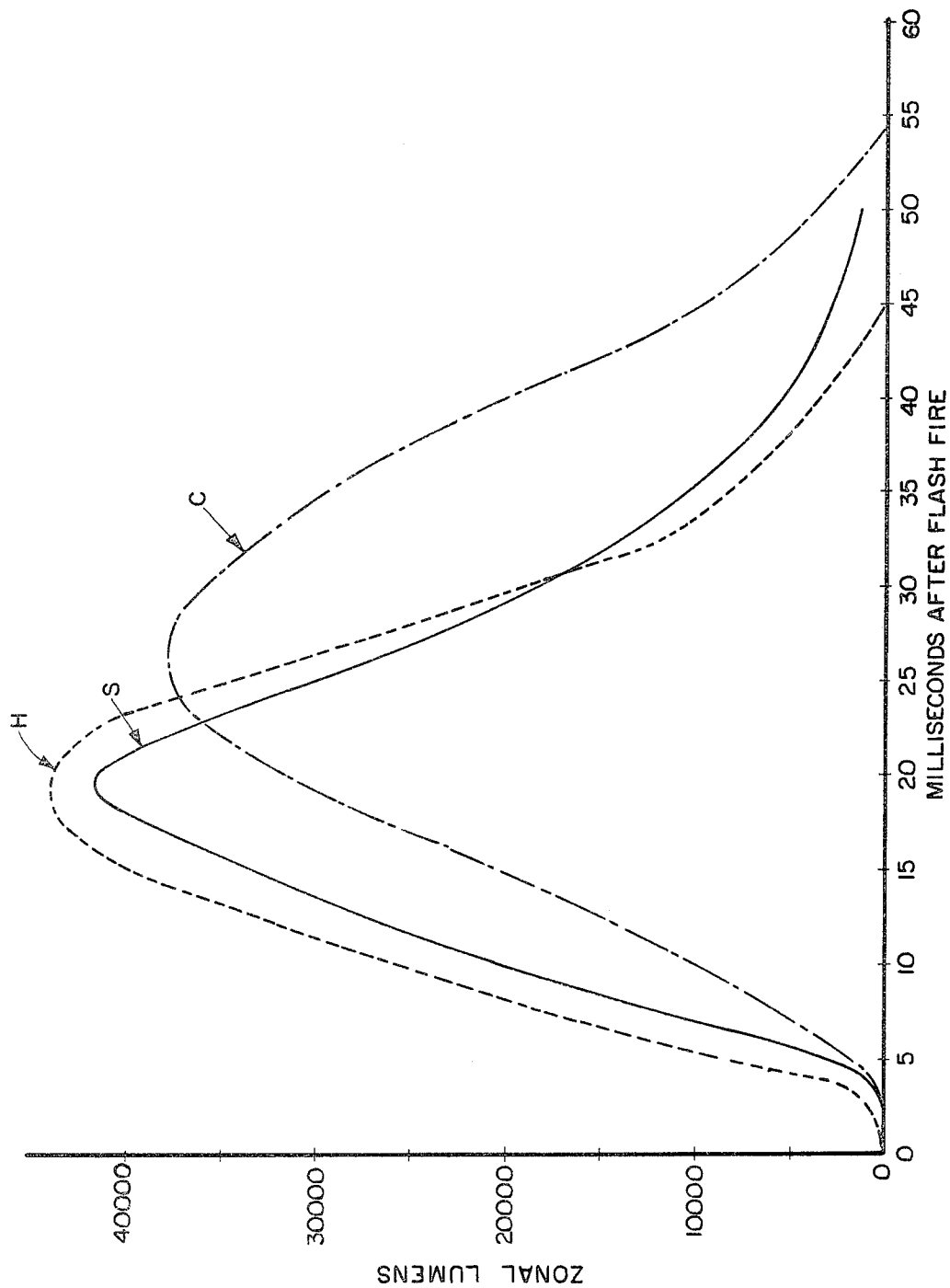
FIG. 5 is a graph showing the time intensity output characteristics of a typical photoflash lamp.

FIG. 5 shows a typical time-light characteristic curve S for such a flash bulb specified by a lamp manufacturer. The flash fire signal is provided at time $t=0$. From $t=0$ to approximately $t=5$ milliseconds, a fine wire ignition filament in the bulb is heated electrically to ignite a primer material thereon, in turn igniting the fine metal foil or wire which burns rapidly in an oxygen atmosphere to produce light. following this ignition delay, the light output builds rapidly to peak intensity at approximately $t=20$ milliseconds and then decays to extinction at approximately $t=50$ milliseconds. The one-half peak intensity range of the output curve approximately 20 milliseconds from t=10 milliseconds to t=30 milliseconds.

Tests have shown the light output characteristics of photoflash lamps may deviate substantially from the specified curve S due to manufacturing variations. Acceleration or delay of the ignition process will offset the entire curve along the time axis thereby causing variations in the time span between flash fire and peak intensity. Also, there are variations from lamp to lamp in the light producing foil burning process. Some lamps tend to burn "hot" as shown by curve H rising and decaying more rapidly than curve S. With a "hot" lamp, the peak intensity and/or the total light output may exceed or be less than specified. Other bulbs tend to burn "cool" taking a longer time to peak and decay with unpredictable variations in peak intensity and total light output.

Compared to a quenchable strobe unit, the light output characteristics of a photoflash lamp are much more variable and the potential for over or underexposure in the flash mode is greater when the exposure control system is dependent upon anticipation of scene lighting conditions after positive control over the shutter operation has been relinquished by the provision of a single trigger signal to initiate the blade closing phase.

Exposure control system 10, embodying the present invention, employs a much different approach to making flash and fill flash exposures with photoflash lamp illumination. In response to the pre-exposure scene brightness and distance inputs 20 and 23, the microcomputer 18 develops or selects at least characterizing elements of an appropriate flash mode trajectory curve signal program and corresponding flash fire time. These characterizing elements correlate the various trajectories in the data base to brightness and distance parameters and specify peak aperture and the percentage of optimum exposure value to be achieved at the various aperture defining step positions of the blade mechanism.

Unlike the development of ambient mode or strobe flash mode trajectory signal programs in which the timing between stepper motor pulse signals is generally specified within the program for the shutter closing phase, the time at which the blade mechanism is to remain at each of the step positions in the program is not definitely specified in advance. These intervals will be determined during the course of the actual exposure in response to the exposure brightness input 20 which serves as a feedback input to supply microcomputer 18 with data about the actual burn characteristics of the photoflash lamp. Broadly speaking, system 10 monitors the scene lighting conditions on a continuous basis during the exposure interval and the operation of the blade mechanism is automatically adjusted in accordance with the burn characteristics of the photoflash lamp to fit the trajectory curve to the observed lighting conditions. That is, the trajectory curve is modulated in accordance with lamp light output characteristics.

Figure 6:
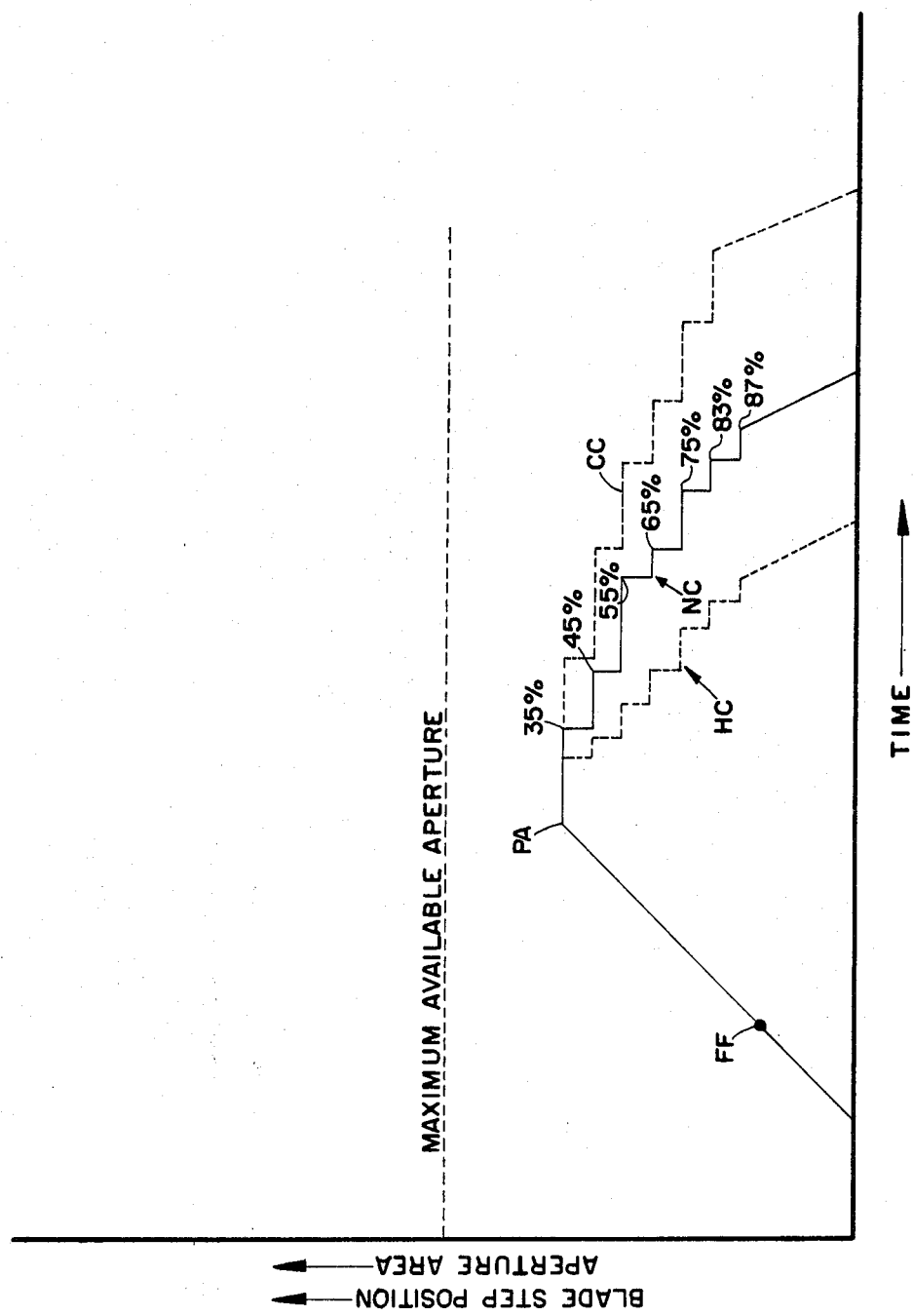
FIG. 6 is a graph showing a typical flash mode trajectory curve and variations thereof for hot and cool burning photoflash lamps.

A representative flash mode trajectory curve and variations thereof for different lamp light output characteristics is shown in FIG. 6. At a predetermined time following the provision of the first pulse signal to the stepper motor, the apertures and the blade mechanism begin to overlap so as to admit first light to the film plane. During the shutter opening phase, the blade mechanism is driven at a constant rate (e.g., one step position each millisecond) until the blades define a peak aperture, PA, which has been selected based on the preexposure scene brightness and distance inputs 20 and 22. At this point, the stepper motor is stopped so that the blades remain at the peak aperture defining position. In this example, the photoflash lamp is fired during the constant slope shutter opening phase at flash fire point FF. As the blade mechanism is opening, the light detection and integrating circuit is actuated to provide the exposure brightness input 22. When input 22 indicates that a predetermined percentage of optimum exposure value has been achieved, the system automatically triggers and provides the next stepper motor signal in the trajectory program to move the blade mechanism to the next lower step position, thereby initiating the shutter closing phase. The blade mechanism is held at this step position until the next higher predetermined percentage of total exposure has been achieved and then the shutter is once again stepped down to the next position, etc. In the illustrated trajectories, the blade mechanism is held at peak aperture until 35% of total exposure has occurred and then the mechanism is displaced to define the next smaller exposure aperture. It is held at this position until 45% of exposure has taken place. This process continues with steps taking place at 55%, 65%, 75%, 83% and 87%. When the 87% level has been reached, the stepper motor is automatically switched to its high torque mode of operation and the blade mechanism 12 is driven as rapidly as possible to the fully closed position. The timing between successive steps during the shutter closing phase between the 35% and 87% exposure levels will be determined by the actual light output of the photoflash lamp. Rather than making a single decision as to when to initiate the shutter closing phase, system 10 utilizes a plurality of decision making points along the closing portion of the trajectory to adjust the general shape in accordance with the light output characteristics. There is still some anticipatory exposure that occurs between the time 87% of total exposure has been observed and the blades reach the fully closed exposure terminating position. However, this represents a rather small percentage of total exposure. More importantly, that position of the exposure preceding the maximum torque mode closing signal has been made with a portion of the trajectory curve that has been adjusted to compensate for variations in the lamp output characteristics.

The closing portion of the trajectory shown in solid lines represents the response of the system to the light output from a "normal" lamp having light output characteristics that more or less conform to the manufacturer's specification. If, under the same ambient lighting conditions the bulb tends to burn "hot", system 10 will respond by adjusting the trajectory so that the closing portion has a generally steeper slope during the shutter closing phase. Such a trajectory is shown in dotted lines and is designated HC. That is, in response to the lamp output peaking sooner than expected, or providing more total light output than expected, the predetermined percentages of total exposure will be achieved earlier in the exposure cycle thereby reducing the total exposure interval so that the closing portion of the trajectory curve will have a generally steeper slope than the normal curve. Conversely, if the bulb is of the "cool" burning type, the interval between successive step positions will increase accordingly and the closing portion of the trajectory for a "cool" burning lamp, designated CC, will have a generally shallower slope than the normal closing portion to extend the exposure interval as required.

In the illustrated embodiment, microcomputer 18 is preprogrammed with data for fifteen different flash mode trajectory curves, designated T1-T15, to cover the ambient brightness range of 0-800 cd/sq. ft. and a camera-to-scene distance range of approximately 10" to 20'. The actual number of trajectory choices provided is not critical to the inventive concepts described herein, but rather will depend on the performance goals for any particular exposure control system that employs these methods. Additional trajectory choices will tend to produce a more finely tuned exposure control system. But, this must be balanced against the cost of additional memory capacity.

Table 1, below, is a matrix arrangement of trajectory curve identifying numbers that shows how trajectory selection is correlated to ambient brightness level and scene distance. Each row of trajectory numbers carries a brightness designation set forth in the first column, and the column of numbers are arranged over corresponding camera-to-scene distance values indicated along the bottom of the Table. The appropriate trajectory number is found at the intersection of the corresponding brightness row and distance column. For example, if the preexposure brightness input is 120 cd/sq. ft. and scene distance is 6 ft., microcomputer 18 will select trajectory T3. If the brightness input stays the same but scene distances increase to 10 ft., then trajectory T7 will be selected.

TABLE I

| brightness cd/sq. ft. | | | | | | | | | | | | | | | | | | | |
|---|---|---|---|---|---|---|---|---|---|---|---|---|---|---|---|---|---|---|
| 800 | 1 | 1 | 1 | 1 | 1 | 1 | 1 | 1 | 1 | 1 | 1 | 1 | 1 | 1 | 1 | 1 | 1 | 1 |
| 672 | 1 | 1 | 1 | 1 | 1 | 1 | 1 | 1 | 1 | 1 | 1 | 1 | 1 | 1 | 1 | 1 | 1 | 1 |
| 564 | 1 | 1 | 1 | 1 | 1 | 1 | 1 | 1 | 1 | 1 | 1 | 1 | 1 | 1 | 1 | 1 | 1 | 1 |
| 476 | 1 | 1 | 1 | 1 | 1 | 1 | 1 | 1 | 1 | 1 | 1 | 1 | 1 | 1 | 1 | 1 | 1 | 1 |
| 400 | 1 | 1 | 1 | 1 | 1 | 1 | 1 | 1 | 1 | 1 | 1 | 1 | 1 | 1 | 1 | 1 | 1 | 1 |
| 336 | 1 | 1 | 1 | 2 | 2 | 2 | 2 | 2 | 2 | 2 | 2 | 1 | 1 | 1 | 2 | 2 | 2 | 2 |
| 284 | 1 | 1 | 1 | 2 | 2 | 2 | 2 | 2 | 2 | 2 | 2 | 2 | 2 | 2 | 2 | 2 | 3 | 3 |
| 236 | 1 | 1 | 1 | 2 | 2 | 2 | 2 | 2 | 2 | 2 | 2 | 2 | 2 | 2 | 2 | 3 | 3 | 4 |
| 200 | 1 | 1 | 1 | 2 | 2 | 2 | 2 | 2 | 2 | 2 | 2 | 2 | 2 | 2 | 2 | 4 | 4 | 4 |
| 168 | 1 | 1 | 1 | 2 | 2 | 2 | 2 | 2 | 2 | 2 | 2 | 2 | 2 | 2 | 2 | 4 | 5 | 5 |
| 140 | 1 | 1 | 1 | 2 | 2 | 2 | 2 | 2 | 2 | 2 | 2 | 2 | 2 | 3 | 3 | 4 | 5 | 6 |
| 120 | 1 | 1 | 1 | 2 | 2 | 2 | 2 | 2 | 2 | 2 | 2 | 2 | 2 | 3 | 3 | 5 | 5 | 6 |
| 100 | 1 | 1 | 1 | 2 | 2 | 2 | 2 | 2 | 2 | 2 | 2 | 3 | 3 | 3 | 3 | 5 | 6 | 6 |
| 84 | 1 | 1 | 1 | 2 | 2 | 2 | 2 | 2 | 2 | 2 | 3 | 3 | 3 | 3 | 3 | 5 | 6 | 7 |
| 72 | 1 | 1 | 1 | 2 | 2 | 2 | 2 | 2 | 2 | 2 | 3 | 3 | 3 | 3 | 3 | 5 | 6 | 7 |
| 60 | 1 | 1 | 1 | 2 | 2 | 2 | 2 | 3 | 3 | 3 | 3 | 3 | 3 | 3 | 4 | 4 | 6 | 6 | 7 |
| 56 | 1 | 1 | 1 | 2 | 2 | 2 | 2 | 3 | 3 | 3 | 3 | 3 | 3 | 3 | 4 | 4 | 6 | 7 | 7 |
| 52 | 1 | 1 | 1 | 2 | 2 | 2 | 2 | 3 | 3 | 3 | 3 | 3 | 3 | 3 | 4 | 4 | 6 | 7 | 7 |
| 48 | 1 | 1 | 1 | 2 | 2 | 2 | 3 | 3 | 3 | 3 | 3 | 3 | 3 | 4 | 4 | 6 | 7 | 8 |
| 44 | 1 | 1 | 1 | 2 | 2 | 2 | 3 | 3 | 3 | 3 | 3 | 3 | 3 | 4 | 4 | 6 | 7 | 8 |
| 40 | 1 | 1 | 1 | 2 | 2 | 2 | 3 | 3 | 3 | 3 | 3 | 3 | 3 | 4 | 4 | 6 | 7 | 8 |
| 36 | 1 | 1 | 1 | 2 | 2 | 2 | 3 | 3 | 3 | 3 | 3 | 4 | 4 | 4 | 4 | 6 | 7 | 8 |
| 32 | 1 | 1 | 1 | 2 | 2 | 2 | 3 | 3 | 3 | 3 | 4 | 4 | 4 | 4 | 4 | 6 | 7 | 8 |
| 28 | 1 | 1 | 1 | 2 | 2 | 2 | 3 | 3 | 3 | 3 | 4 | 4 | 4 | 4 | 5 | 6 | 7 | 8 |
| 24 | 1 | 1 | 1 | 2 | 2 | 2 | 3 | 3 | 3 | 3 | 4 | 4 | 4 | 4 | 5 | 6 | 7 | 8 |
| 20 | 1 | 1 | 1 | 2 | 2 | 2 | 3 | 3 | 3 | 3 | 4 | 4 | 4 | 4 | 5 | 6 | 7 | 8 |
| 16 | 1 | 1 | 1 | 2 | 2 | 2 | 3 | 3 | 3 | 3 | 4 | 4 | 4 | 5 | 5 | 6 | 7 | 8 |
| 12 | 1 | 1 | 1 | 2 | 2 | 2 | 3 | 3 | 3 | 3 | 4 | 4 | 4 | 5 | 5 | 6 | 7 | 8 |
| 8 | 1 | 1 | 1 | 2 | 2 | 2 | 3 | 3 | 3 | 3 | 4 | 4 | 4 | 5 | 5 | 6 | 7 | 8 |
| 4 | 1 | 1 | 1 | 2 | 2 | 2 | 3 | 3 | 3 | 3 | 4 | 4 | 4 | 5 | 6 | 7 | 8 | 9 |
| 0 | 1 | 1 | 1 | 2 | 2 | 2 | 3 | 3 | 3 | 3 | 4 | 4 | 4 | 5 | 6 | 7 | 8 | 9 |
| distance | 1 | | | 2 | | | 3 | | | | 4 | 5 | 6 | | | 7 | 8 | |

| brightness | | | | | | | | | | | | |
|---|---|---|---|---|---|---|---|---|---|---|---|---|
| 800 | 1 | 1 | 1 | 1 | 1 | 1 | 1 | 1 | 1 | 1 | 1 | 1 |
| 672 | 1 | 1 | 1 | 1 | 1 | 1 | 1 | 1 | 1 | 1 | 1 | 1 |
| 564 | 1 | 1 | 1 | 1 | 1 | 1 | 1 | 1 | 1 | 1 | 1 | 1 |
| 476 | 1 | 1 | 1 | 1 | 1 | 1 | 1 | 1 | 1 | 1 | 1 | 1 |
| 400 | 1 | 1 | 1 | 1 | 1 | 1 | 1 | 1 | 1 | 1 | 1 | 1 |
| 336 | 2 | 2 | 2 | 2 | 2 | 2 | 2 | 2 | 2 | 2 | 2 | 2 |
| 284 | 3 | 3 | 3 | 3 | 3 | 3 | 4 | 4 | 4 | 4 | 4 | 4 |
| 236 | 4 | 4 | 5 | 5 | 5 | 5 | 5 | 5 | 6 | 6 | 6 | 6 |
| 200 | 5 | 5 | 6 | 6 | 6 | 6 | 7 | 7 | 7 | 7 | 7 | 7 |
| 168 | 6 | 6 | 7 | 7 | 7 | 7 | 8 | 8 | 8 | 8 | 8 | 8 |
| 140 | 6 | 7 | 7 | 8 | 8 | 8 | 9 | 9 | 9 | 9 | 9 | 9 |
| 120 | 7 | 7 | 8 | 9 | 9 | 9 | 9 | 9 | 10 | 10 | 10 | 10 |
| 100 | 7 | 8 | 9 | 9 | 9 | 9 | 10 | 10 | 11 | 11 | 11 | 11 |
| 84 | 8 | 8 | 9 | 10 | 10 | 10 | 11 | 11 | 11 | 11 | 11 | 11 |
| 72 | 8 | 9 | 9 | 10 | 10 | 10 | 11 | 11 | 12 | 12 | 12 | 12 |
| 60 | 8 | 9 | 10 | 11 | 11 | 11 | 11 | 11 | 12 | 12 | 12 | 12 |
| 56 | 8 | 9 | 10 | 11 | 11 | 11 | 12 | 12 | 12 | 12 | 12 | 12 |
| 52 | 8 | 9 | 10 | 11 | 11 | 11 | 12 | 12 | 13 | 13 | 13 | 13 |
| 48 | 8 | 9 | 10 | 11 | 11 | 11 | 12 | 12 | 13 | 13 | 13 | 13 |
| 44 | 9 | 9 | 10 | 11 | 11 | 11 | 12 | 12 | 13 | 13 | 13 | 13 |
| 40 | 9 | 9 | 10 | 11 | 11 | 11 | 12 | 12 | 13 | 13 | 13 | 13 |
| 36 | 9 | 10 | 11 | 11 | 11 | 11 | 12 | 12 | 13 | 13 | 13 | 13 |
| 32 | 9 | 10 | 11 | 12 | 12 | 12 | 12 | 12 | 13 | 13 | 13 | 13 |
| 28 | 9 | 10 | 11 | 12 | 12 | 12 | 13 | 13 | 14 | 14 | 14 | 14 |
| 24 | 9 | 10 | 11 | 12 | 12 | 12 | 13 | 13 | 14 | 14 | 14 | 14 |
| 20 | 9 | 10 | 11 | 12 | 12 | 12 | 13 | 13 | 14 | 14 | 14 | 14 |
| 16 | 9 | 10 | 11 | 12 | 12 | 12 | 13 | 13 | 14 | 14 | 14 | 14 |
| 12 | 9 | 10 | 11 | 12 | 12 | 12 | 13 | 13 | 14 | 14 | 14 | 14 |
| 8 | 9 | 10 | 11 | 12 | 12 | 12 | 13 | 13 | 14 | 14 | 14 | 14 |
| 4 | 10 | 11 | 12 | 13 | 13 | 13 | 14 | 14 | 15 | 15 | 15 | 15 |
| 0 | 10 | 11 | 12 | 13 | 13 | 13 | 14 | 14 | 15 | 15 | 15 | 15 |
| | | 10 | | 12 | | 14 | | 16 | | 18 | | 20 ft. |

TABLE I-continued cd/sq. ft.

distance

The characterizing elements of each of the trajectories T1-T15 along with a corresponding flash lamp firing time are set forth in Table II below.

TABLE II

| step position | f# | T1 | T2 | T3 | T4 | T5 | T6 | T7 | T8 | T9 | T10 | T11 | T12 | T13 | T14 | T15 |
|---|---|---|---|---|---|---|---|---|---|---|---|---|---|---|---|---|
| 27 | 8.2 | | | | | | | | | | | 0 | 0 | 0 | 0 | 0 |
| 26 | 8.2 | | | | | | | | | | 0 | 36 | 45 | 50 | 70 | 87 |
| 25 | 8.3 | | | | | | | | | | 30 | 48 | 55 | 65 | 83 | 87 |
| 24 | 8.6 | | | | | | | | | 0 | 40 | 56 | 65 | 74 | 87 | 87 |
| 23 | 9.0 | | | | | | | | 0 | 30 | 50 | 64 | 72 | 80 | 87 | 87 |
| 22 | 9.4 | | | | | | | | 30 | 40 | 60 | 70 | 78 | 84 | 87 | 87 |
| 21 | 10.0 | | | | | | | 0 | 40 | 50 | 68 | 76 | 84 | 87 | 87 | 87 |
| 20 | 10.8 | | | | | | 0 | 35 | 50 | 60 | 75 | 82 | 87 | 87 | 87 | 87 |
| 19 | 11.8 | | | | | | 35 | 50 | 60 | 70 | 82 | 85 | 87 | 87 | 87 | 87 |
| 18 | 12.8 | | | | | 0 | 45 | 60 | 70 | 80 | 86 | 87 | 87 | 87 | 87 | 87 |
| 17 | 14.0 | | | | | 40 | 55 | 70 | 78 | 87 | 87 | 87 | 87 | 87 | 87 | 87 |
| 16 | 15.6 | | | | 0 | 50 | 65 | 76 | 85 | 87 | 87 | 87 | 87 | 87 | 87 | 87 |
| 15 | 17.7 | | | | 40 | 60 | 75 | 82 | 87 | 87 | 87 | 87 | 87 | 87 | 87 | 87 |
| 14 | 20.5 | | | | 60 | 70 | 83 | 87 | 87 | 87 | 87 | 87 | 87 | 87 | 87 | 87 |
| 13 | 24.1 | | | 0 | 70 | 80 | 87 | 87 | 87 | 87 | 87 | 87 | 87 | 87 | 87 | 87 |
| 12 | 28.0 | | 0 | 60 | 80 | 87 | 87 | 87 | 87 | 87 | 87 | 87 | 87 | 87 | 87 | 87 |
| 11 | 32.2 | | 20 | 75 | 85 | 87 | 87 | 87 | 87 | 87 | 87 | 87 | 87 | 87 | 87 | 87 |
| 10 | 37.4 | | 50 | 82 | 87 | 87 | 87 | 87 | 87 | 87 | 87 | 87 | 87 | 87 | 87 | 87 |
| 9 | 43.7 | 0 | 70 | 87 | 87 | 87 | 87 | 87 | 87 | 87 | 87 | 87 | 87 | 87 | 87 | 87 |
| 8 | 51.8 | 40 | 85 | 87 | 87 | 87 | 87 | 87 | 87 | 87 | 87 | 87 | 87 | 87 | 87 | 87 |
| 7 | 62.1 | 70 | 87 | 87 | 87 | 87 | 87 | 87 | 87 | 87 | 87 | 87 | 87 | 87 | 87 | 87 |
| 6 | 75.3 | 85 | 87 | 87 | 87 | 87 | 87 | 87 | 87 | 87 | 87 | 87 | 87 | 87 | 87 | 87 |
| 5 | 95.2 | 87 | 87 | 87 | 87 | 87 | 87 | 87 | 87 | 87 | 87 | 87 | 87 | 87 | 87 | 87 |
| 4 | 147 | 87 | 87 | 87 | 87 | 87 | 87 | 87 | 87 | 87 | 87 | 87 | 87 | 87 | 87 | 87 |
| 3 | ∞ | 87 | 87 | 87 | 87 | 87 | 87 | 87 | 87 | 87 | 87 | 87 | 87 | 87 | 87 | 87 |
| 2 | ∞ | 87 | 87 | 87 | 87 | 87 | 87 | 87 | 87 | 87 | 87 | 87 | 87 | 87 | 87 | 87 |
| 1 | ∞ | 87 | 87 | 87 | 87 | 87 | 87 | 87 | 87 | 87 | 87 | 87 | 87 | 87 | 87 | 87 |
| 0 | ∞ | 87 | 87 | 87 | 87 | 87 | 87 | 87 | 87 | 87 | 87 | 87 | 87 | 87 | 87 | 87 |
| Flash Fire Time | | −18 | −10 | −5 | 0 | 5 | 7 | 8 | 10 | 11 | 12 | 14 | 16 | 17 | 20 | 27 |

The blade mechanism step positions (0-27) and the f-number of the corresponding exposure aperture defined thereat are shown in the first two columns of Table II. At step positions 0, 1, 2 and 3, the blade openings 52 and 64 do not overlap at all so the shutter is fully closed and the f-number is infinity. At step position 4, overlap begins and first light is transmitted through the exposure aperture 70 which defines an aperture of f147. Opening 70 defines a maximum aperture of f8.2 at step positions 26 and 27. During the shutter closing phase, light transmission is terminated at step 3, but it is preferable to drive the blades beyond that point to the 0 step position to provide aditional overlap thereby insuring that there is no light leak through the blade mechanism.

The numbers in each of the trajectory columns designate the assigned percentages of optimum exposure that it is desired to achieve during the blade closing phase. The bottom row in the table shows the flash fire time in milliseconds relative to providing the first trajectory signal to the stepper motor drive circuit 16. Negative numbers indicate that the lamp is to be fired before blade displacement.

Certain boundary conditions have been set for the illustrated flash mode exposure method. It is generally accepted that handheld exposures can be made without image blur providing the exposure interval does not exceed approximately 50 milliseconds. Therefore, the system 10 is designed to automatically trigger maximum torque mode closing of the blade mechanism at 43 milliseconds into the exposure interval even if the exposure level set forth in the trajectory table has not been achieved. This could occur if the photoflash lamp fails to fire. In any event, triggering maximum torque mode closing at 43 milliseconds will insure that the total exposure interval will not exceed the 50 millisecond limit.

The second precondition is that maximum torque mode closing will also be automatically triggered when 87% of optimum exposure has been achieved in recognition that it does take some finite time to move the blade mechanism to its fully closed position and that additional exposure will take place after the provision of the maximum torque mode closing signal.

Let's assume that the preexposure brightness input 20 indicates that the ambient brightness level is 120 cd/sq. ft. and the distance input 23 indicates that the camera-to-scene distance is 8 ft. Using the data in Matrix Table I, microcomputer 18 will select trajectory T6 for this exposure.

Table II shows that the T6 trajectory contemplates opening the blade mechanism to a peak aperture of f10.8 (step 20). The photoflash lamp will be fired during the shutter opening phase at 7 milliseconds after the first step signal is provided to the stepper motor drive circuit 16. The blade mechanism then will be closed in steps, on a hold and wait basis as shown in FIG. 6, down to step position 13 to achieve 85% of optimum exposure value. Thereafter, the system will automatically shift to the maximum torque mode of operation at the 87% exposure limit to drive the blade mechanism as rapidly as possible back to the 0 step position.

The blade mechanism is driven at a constant rate from step position 0 to 20 at one step per millisecond during the shutter opening phase provided that the exposure percentages shown in Table II have not been exceeded at each step position. That is, at step position 1 the exposure brightness level input 20 will be checked to insure that 87% of the optimum exposure value has not yet occurred. If this condition is met, the next pulse signal will be provided to move the blade mechanism to step position 2, and so on. If, when the blade mechanism reaches step position 19, 35% of optimum exposure value has not been achieved, then the last opening pulse signal will be provided and the blade mechanism will be moved to the peak aperture defining step position 20 where it will be held until 35% is achieved. The 0 that appears in the percentage column for each trajectory at the peak apertue step position is not indicative of 0% of optimum exposure value, but rather represents a logic signal used to inhibit further blade mechanism opening past the prescribed peak aperture. When 35% of optimum exposure value has been achieved, the next pulse signal will be provided to the stepper motor drive circuit to drive the blade mechanism to the next lower step position 19 where it will be held until 45% of exposure value has occurred. The hold, wait and step process continues until the blade mechanism reaches step 14 where it is held until the 87% level is achieved. Thereafter, the system reverts to the maximum torque drive mode to close the blades as rapidly as possible.

If, during the shutter opening phase the scene lighting conditions are such that 45% of exposure has been achieved when the blade mechanism has reached the step 18 position, the system will immediately convert into the shutter closing phase of operation and provide the appropriate directional change signals and step pulse to drive the shutter mechanism back to the step 17 position. If at that time 55% has not been achieved, it will revert to its hold, wait and step sequence. That is, if the percentages set forth in Table II have been exceeded during opening, the system will not continue to drive forwardly to the next higher step position. In this case, the required percentage had already been achieved at step position 18 so the stepper motor drive pulses for advancing the blade mechanism to steps 19 and 20 will be automatically omitted from the trajectory signal program.

The flash fire time is different for each of the 15 trajectories. For example, T1 has the smallest peak aperture (f43.7) and, as indicated by Table I, is used when the ambient brightness level is very high (400–800 cd/sq. ft.) and/or when the scene to be photographed is very close to the camera, i.e., approximately 10–15 in. Even though the peak and effective aperture is quite small, with these scene conditions a full light output of the photoflash lamp cannot be utilized without causing overexposure. Therefore, the lamp is fired a full 18 milliseconds before the first trajectory signal is provided to the stepper motor drive circuit 16 so that the peak aperture defined by the blade mechanism occurs well after peak flash intensity during the decaying portion of the lamp time-light curve. That is, a major portion of the total light output from the lamp occurs before first light transmission through the shutter and is intentionally "wasted" under these conditions to better control exposure.

The trajectories T2–T15 are used successively for decreasing ambient brightness level and/or increasing camera-to-scene distances. As shown in Table II, the timing of the flash fire signal is adjusted accordingly to that peak light intensity bears a predetermined relationship to the attainment of the peak aperture.

Figure 7:
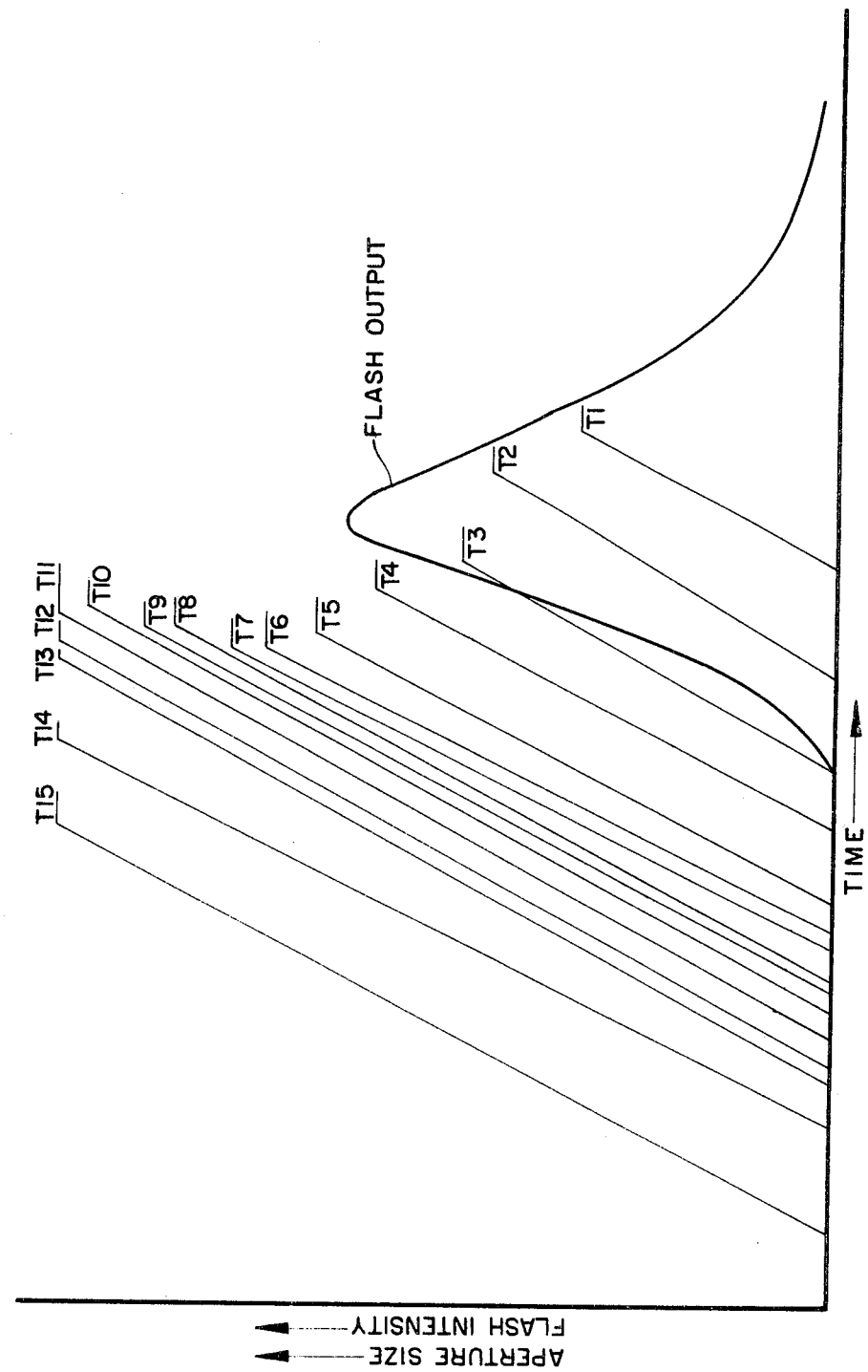
FIG. 7 is a graph showing the opening portions of fifteen different flash mode trajectory curves available from the data base and a flash lamp output curve showing the time relationship between peak aperture and peak light intensity.

In FIG. 7, the opening portions up to peak aperture, of trajectories T1–T15 are plotted along with the time intensity curve for the photoflash lamp to show this relationship. It will be noted that a the peak aperture increases for the higher numbered trajectories, the firing time is progressively extended later into the exposure cycle to fully utilize the total light output of the photoflash lamp. For exmple, trajectories T13, T14 and T15 are used when the ambient brightness level is very low and/or camera-to-scene distance is in the 16–20 ft. range and the flash is fired between 17 and 27 seconds after the shutter begins to open so that the blade mechanism is already at the peak aperture defining position before any significant amount of light is emitted from the photoflash lamp.

The distribution of trajectory numbers in the matrix table is a result of initial estimations that have been refined by trial and error. The corresponding trajectory data in Table II was initially provided using computer simulation techniques and also has been refined after making a series of test exposures. Those skilled in the art will understand that the data provided in Tables I and II is by way of illustration only and that it is subject to change as more experience is gained with this system and method.

In a preferred embodiment of the present invention, the light measurement network 40 includes a light to frequency circuit for converting the analog brightness level signal provided by the photocells to digital form. The converter provdies pulse output signals at a rate that is directly proportional to the instantaneous measured light intensity level. The output pulses are accumlated in a digital counter so that the integrated light measurement at any time during the course of an exposure cycle is represented by an integrator count number. The percentages of optimum exposure value to be achieved at each of the step positions for the various trajectories are correlated to the integrated count number and various computer command signals are generated by comparing the instantaneous integrator cound number with these preprogrammed numbers. The system also includes a digital clock and time control network to provide the shutter opening pulses at one millisecond intervals, to provide the shutter closing trigger signal at 43 milliseconds so that the total exposure interval will not exceed 50 milliseconds and to keep track of elapsed time to effect flash firing at the designated time set forth for each of the trajectories in Table II.

Figure 8:
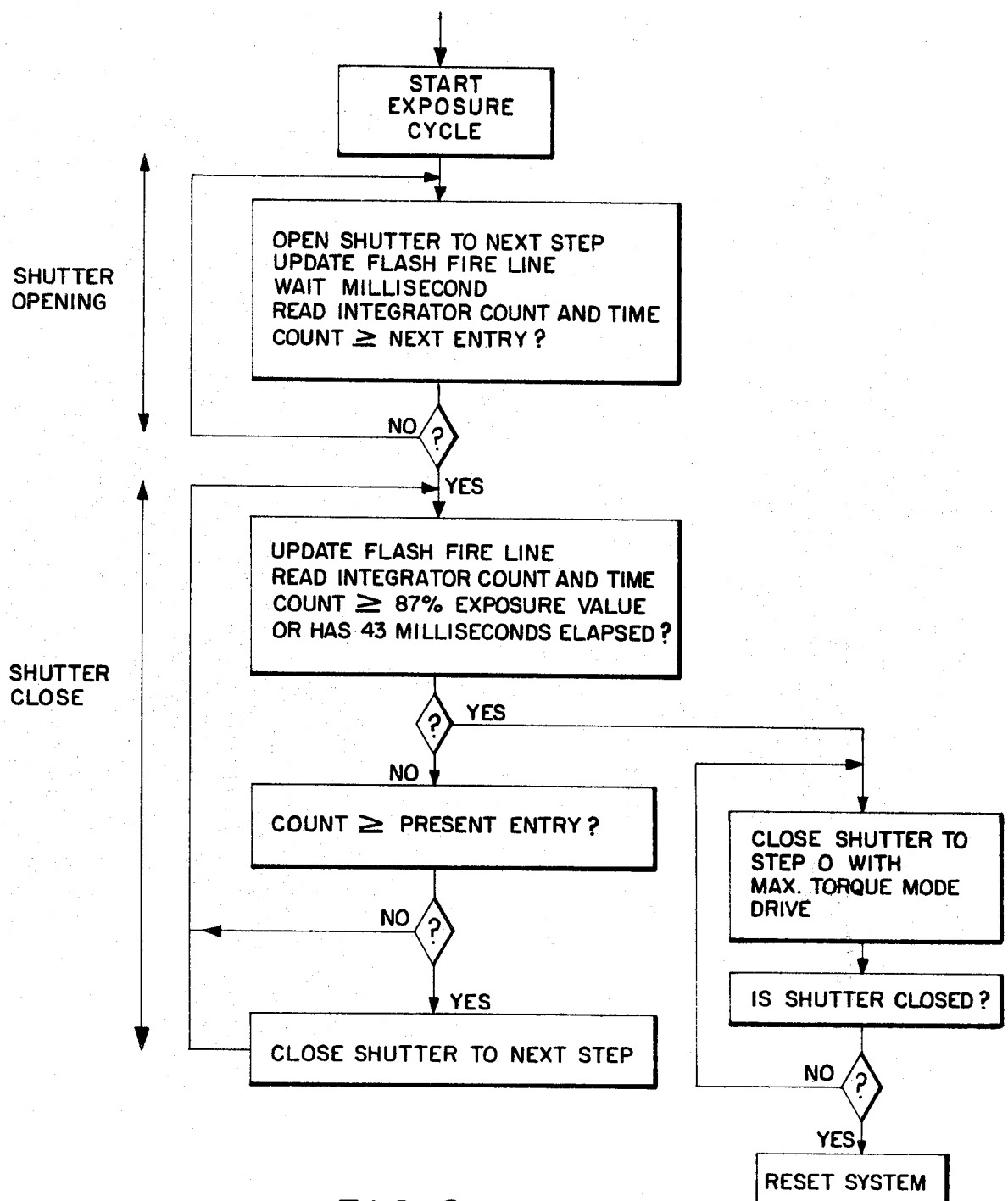
FIG. 8 is a flow chart showing the sequence of events in a flah mode exposure cycle.

A diagrammatic outline of how system 10 operates in the flash mode is set forth in FIG. 8 showing the sequence of events carried out under the control of microcomputer 18 and illustrating the exposure decision making process that is preprogrammed into its control section.

Following the selection of an appropriate flash mode trajectory curve and corresponding flash firing time, a logic signal is automatically provided to initiate the exposure cycle. The first trajectory program signal is fed to the stepper motor drive circuit and the blade mechanism is driven open from step 0 to step 1. A flash fire line is updated to compare the elapsed time with the designated flash fire time. For trajectories T1, T2 and T3, the photoflash lamp will be fired before the provision of the first trajectory program signal. During the one millisecond hold, the integrator count number and elapsed time is read. The count number is compared with the designated percentage of optimum exposure value set forth in the trajectory table for that particular step position to find out if it is equal to or greater than the indicated value. If this value has not been exceeded, then the shutter is opened to the next scheduled step position and the flash update and count and time comparison cycle is repeated. If the exposure does not exceed its preprogrammed limits, the blade mechanism will be opened at a constant rate of one step per millisecond until it reaches the designated peak aperture.

When the count does reach the predetermined number, or exceeds it, the shutter closing phase is triggered. Again, there is an update of the flash fire line because for certain trajectories the photoflash lamp may not yet have been scheduled to be fired. Also, the intregrator count number and time is checked.

If the count number is equal to or exceeds a number representative of 87% of optimum exposure value, or the elapsed time has reached the limit of 43 milliseconds, a logic signal will be provided to trigger the maximum torque mode drive to close the shutter as rapidly as possible to its step 0 position. Blade position is monitored by the encoder and the closing drive signals are provided until it indicates that the blades are at the 0 step position. Upon this occurrence, the system is automatically reset.

If, however, the exposure and time limits have not been exceeded, the count number is checked to find out if the scheduled percentage of total exposure has occurred. If the indication is negative, then the system recycles through the reading of the count number and time once again. The blades will be held at the designated step position until there is a positive indication that the integrator count number is equal to or exceeds the scheduled entry. When this occurs, the shutter is closed to its next scheduled step position and the hold and wait cycle is repeated. The system continues to cycle in this manner until the 87% of exposure value limit has been reached or the 43 millisecond time limit has been exceeded. Upon the occurrence of either of these events, the system will automatically shift to the maximum torque drive shutter closing mode.

Those skilled in the art will appreciate there are many different ways that microcomputer 18 can be programmed to carry out the general aspects of the flash mode method described herein and that the sequence of steps shown in FIG. 8 is but one variation of such method.

The flash method disclosed up to this point places primary emphasis on controlling the total amount of light that reaches the film plane without attempting to tightly regulate the ratio of ambient to flash light contribution.

In the previously-noted commonly-assigned copending application U.S. Ser. No. 275,718 (now U.S. Pat. No. 4,354,748), the computer controlled dynamic aperture shutter is programmed for flash mode operation with a quenchable electronic strobe unit. Because the light output characteristics can be accurately controlled and the light pulse is of such short duration compared to the total exposure interval, at higher ambient light levels the system can readily function in a proportional fill flash mode. That is, the mixture of ambient and flash light can be held at a preferred ratio, e.g. 75% ambient and 25% flash.

Proportional fill flash is much more difficult to achieve with photoflash lamp illumination. However, the system described up to this point may be programmed for proportional fill flash operation for certain combinations of ambient brightness and camera-to-scene distance while utilizing the trajectory adjustment techniques set forth above.

Figure 9:
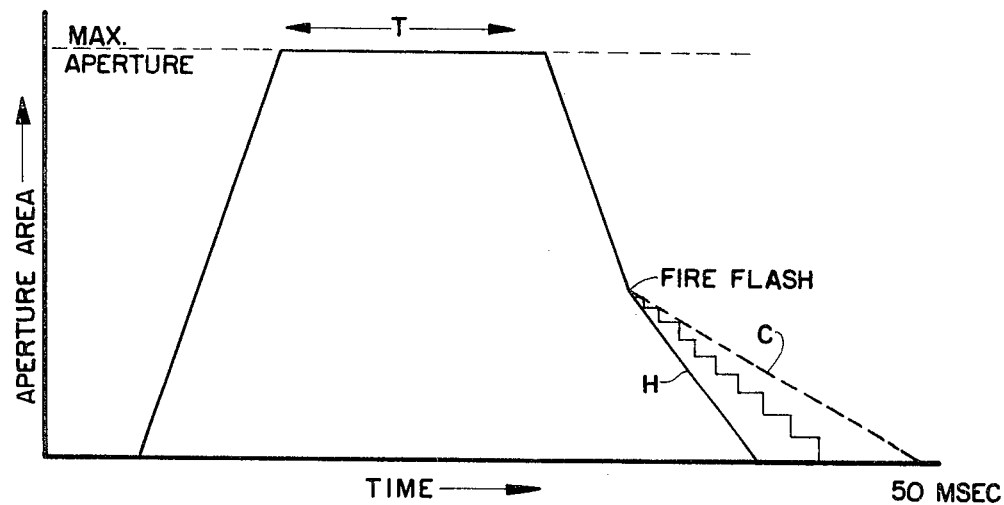
FIG. 9 is a graph showing a flash mode trajectory curve, and variations thereof for different photoflash lamps, for an alternative proportional fill flash method for low ambient light and a close subject.

FIG. 9 shows a trajectory adjustment curve for low ambient light and a close subject. The shutter is open to maximum aperture and helf there for a time period T that is determined by the ambient brightness level. The shutter is then closed at the same rate until it reaches a flash fire aperture which is selected in accordance with subject distance. Upon firing the photoflash lamp trajectory is then adjusted on the hold and wait basis previously described so that the remainder of the closing portion of the trajectory will be adjusted in accordance with the light output characteristics of the particular photoflash lamp. After flash fire, the general slope of the stepped trajectory will fall somewhere between slope H for a "hot" burning lamp and slope C for a "cool" burning lamp.

Figure 10:
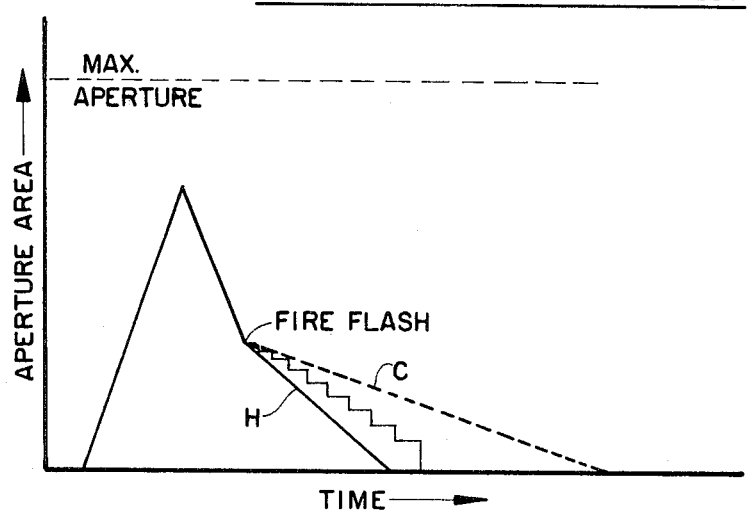
FIG. 10 is similar to FIG. 9 except the trajectories are tailored for high ambient light and a close subject.

FIG. 10 shows a trajectory for high ambient light level and a close subject. This time the shutter is opened to a peak aperture that is related to ambient brightness level and then is closed at the same rate until the flash fire aperture, related to subject distance, is reached whereupon the photoflash lamp is fired. Again, the slope of the remainder of the closing phase will be determined by the light output characteristics of the photoflash lamp.

Generally speaking, this proportional fill flash method contemplates tailoring of the major portion of the trajectory in accordance with the ambient light characteristics of the scene and withholding the flash firing until the shutter closing phase has commenced. Thereafter, the flash contribution to exposure dominates and the trajectory is selectively adjusted in accordance with the burn characteristics of the photoflash lamp.

Since certain changes may be made in the abovedescribed exposure control system, method and photographic apparatus incorporating the same, without departing from the scope and spirit of the invention herein involved, it is intended that all matter contained in the above description or shown in the accompanying drawings shall be interpreted as being illustrative and not in a limiting sense.

We claim:

1. An exposure control system usable in a camera for controlling transmission of image forming light rays from a scene to a film unit located in a film plane, said system being operable in an imbient light mode and a flash mode wherein the scene is illuminated by a mixture of ambient light and artificial illumination provided from a combustible filament photoflash lamp which, when fired, may have light output characteristics that differ from its output specifications, said system comprising:
   a blade mechanism;
   means for mounting said blade mechanism for displacement between a first arrangement wherein it blocks transmission of scene light to the film plane and a second arrangement wherein it defines a maximum aperture, said blade mechanism serving to define a range of progressively increasing sized aperture as it moves from its said first arrangement toward its said second arrangement and then a range of progressively decreasing sized apertures as it returns to its said first arrangement during the course of an exposure interval for regulating transmission of scene light to the film plane;
   drive means responsive to a program of trajectory signals for driving said blade mechanism in a manner whereby its operation is characterized by an aperture size versus time trajectory curve defined by said program of trajectory signals;

means for connecting a flash unit to said system which is responsive to a firing signal for firing such a flash lamp to provide a source of artificial illumination directed toward the scene;

means for selectively setting said system for either ambient light or flash mode of operation;

means for providing pre-exposure inputs indicative of scene brightness level and camera-to-scene distance and an exposure brightness input indicative of scene brightness level during the course of an exposure interval; and control means operative upon actuation for controlling a cycle of system operation, said control means including a memory section having a preprogrammed trajectory and flash fire data base stored therein, said data base including at least characterizing elements of a plurality of different ambient light trajectory signal programs each correlated to a different range of ambient scene brightness levels, at least characterizing elements of a plurality of different flash mode trajectory signal programs each correlated to the specified light output characteristics of such a flash lamp and different combination of ranges of ambient scene brightness levels and camera-to-scene distances, and correlated flash firing time data for each of said flash mode trajectory signal programs, said control means further including means responsive to at least said preexposure brightness input, when said system is set for ambient light mode operation, for utilizing said data base and developing therefrom a program of trajectory signals to provide an ambient light trajectory curve appropriate for the indicated scene brightness level, and for feeding said program of trajectory signals to said blade drive means to effect exposure of the film unit and, when said system is set for said flash mode operation, being responsive to said pre-exposure brightness and camera-to-scene distance inputs for utilizing said data base and developing therefrom a program of trajectory signals to provide a flash mode trajectory curve appropriate for the indicated brightness and distance, for selecting the flash firing time corresponding to said developed program, for feeding at least an initial portion of said program to said drive means and providing a flash fire signal to said flash unit at said selected time to initiate an exposure cycle, and following initiation of said exposure cycle being responsive to said exposure brightness input for regulating the provision of said program signals to said drive means to adjust the shape of the trajectory curve for optimum exposure value in response to the light output characteristics of said flash lamp thereby compensating for deviations from its said specified output characteristics.

2. The exposure control system of claim 1 wherein said exposure brightness input is provided over the entire course of said exposure cycle and said input responsive means effects adjustment of said flash mode trajectory curve on a substantially continuous basis.

3. The exposure control system of claim 1 wherein each said program of trajectory signals comprises a series of pulse signals and said input response means effects adjustment of said trajectory curve by regulating the timing at which said pulse signals are sequentially provided to said drive means.

4. The exposure control system of claim 1 wherein said input responsive means is configured to regulate the provision of the flash mode trajectory signal program in accordance with a predetermined schedule of percentages of total light required for optimum exposure value.

5. The exposure control system of claim 4 wherein said flash mode trajectory programs each include a predetermined schedule of said percentages and a designated peak aperture that is correlated to a corresponding combination of pre-exposure brightness and camera-to-scene distance ranges.

6. The exposure control system system of claim 1 wherein said control means includes a microcomputer.

7. The exposure control system of claim 6 wherein said drive means incudes a stepper motor.

8. The exposure control system of claim 7 wherein said input responsive means effects holding said motor at a given step position until a predetermined percentage of light required for optimum exposure value has been detected and then provides the next trajectory program signal to advance the motor to its next prescheduled step.

9. The exposure control system of claim 8 wherein at least the closing portion of said flash mode trajectory curve is defined by a series of hold and wait steps based on a predetermined schedule of percentages of total light required for optimum exposure.

10. The exposure control system of claim 1 wherein said input responsive means effects at least two distinct changes in the flash mode trajectory curve shape to response to said brightness input provided during the course of said exposure cycle.

11. The exposure control system of claim 1 wherein said brightness input is provided during the entire course of said exposure cycle and said input responsive means substantially continuously regulates the provision of said flash mode trajectory program signals to said blade drive means in response to said brightness input.

12. The exposure control system of claim 1 wherein said flash mode trajectory curve has opening and closing portions and said input responsive means effects adjustment of the general slope of at least the closing portion of said curve in accordance with the burn characteristics of said flash lamp.

13. The exposure control system of claim 12 wherein said adjustment is made in a manner whereby said general slope is steeper for a hot burning lamp and is more shallow for a cool burning lamp.

14. The exposure control system of claim 12 wherein the opening and closing portions of said curve are defined in terms of a predetermined schedule of percentages of total light required for optimum exposure value.

15. The exposure control system of claim 14 wherein at any given ambient brightness level said input responsive means reacts to said exposure input to adjust the shape of the flash mode trajectory curve to compensate for variations in the light output characteristics of the particular flash lamp employed to make a given exposure.

16. The exposure control system of claim 1 wherein said input responsive means reacts to said exposure brightness input on a real time basis to effect at least two adjustments of the shape of said flash mode trajectory curve.

17. The exposure control system of claim 1 wherein said flash mode trajectory signal programs include provisions for operating said drive means so that said blade mechanism opens at a substantially constant predetermined opening rate and, after a predetermined percentage of optimum exposure value has been achieved, closes at a closing rate that is different than said opening rate.

18. The exposure control system of claim 17 wherein said drive means includes a stepper motor and stepper motor drive circuit and said drive circuit is operated in a normal torque mode for driving said motor at said opening rate and in a maximum torque mode for driving said motor at said greater closing rate.

19. The exposure control system of claim 1 wherein said flash mode includes a fill flash mode.

20. A camera operable in an ambient light mode and a flash and fill flush mode wherein the scene to be photographed is illustrated with a mixture of ambient light and artificial illumination provided by a combustible photoflash lamp which, when fired, may have light output characteristics that differ from its output specifications due to manufacturing variances, said camera comprising:
   means for supporting a film unit at a film plane;
   means for focusing image forming light rays from a scene at said film plane;
   a blade mechanism;
   means for mounting said blade mechanism for displacement between a first arrangement wherein it blocks transmission of scene light to the film plane and a second arrangement wherein it defines a maximum aperture, said blade mechanism serving to define a range of progressively increasing sized aperture as it moves from its said first arrangement toward its said second arrangement and then a range of progressively decreasing sized apertures as it returns to its said first arrangement during the course of an exposure interval for regulating transmission of scene light to the film plane;
   drive means respponsive to a program of trajectory signals for driving said blade mechanism in a manner whereby its operation is characterized by an aperture size versus time trajectory curve defined by said program of trajectory signals;
   means for connecting a flash unit to said system which is responsive to a firing signal for firing such a flash lamp to provide a source of artificial illumination directed toward the scene;
   means for selectively setting said system for either ambient light or flash mode operation;
   means for providing pre-exposure inputs indicative of scene brightness level and camera-to-scene distance and an exposure brightness input indicative of scene brightness level during the course of an exposure interval; and
   control means operative upon actuation for controlling a cycle of system operation, said control means including a memory section having a preprogrammed trajectory and flash fire data base stored therein, said data base including at least characterizing elements of a plurality of different ambient light trajectory signal programs each correlated to a different range of ambient scene brightness levels, at least characterizing elements of a plurality of different flash mode trajectory signal programs each correlated to the specified light output characteristics of such a flash lamp and different combination of ranges of ambient scene brightness levels and camera-to-scene distances, and correlated flash firing time data for each of said flash mode trajectory signal programs, said control means further including means responsive to at least said pre-exposure brightness input, when said system is set for ambient light mode operation, for utilizing said data base and developing therefrom a program of trajectory signals to provide an ambient light trajectory curve appropriate for the indicated scene brightness level, and for feeding said program of trajectory signals to said blade drive means to effect exposure of the film unit and, when said system is set for said flash mode operation, being responsive to said pre-exposure brightness and camera-to-scene distance inputs for utilizing said data base and developing therefrom a program of trajectory signals to provide a flash mode trajectory curve appropriate for the indicated brightness and distance, for selecting the flash firing time corresponding to said developed program, for feeding at least an initial portion of said program to said drive means and providing a flash fire signal to said flash unit at said selected time to initiate an exposure cycle, and following initiation of said exposure cycle being responsive to said exposure brightness input for regulating the provision of said program signals to said drive means to adjust the shape of the trajectory curve for optimum exposure value in response to the light output characteristics of said flash lamp thereby compensating for deviations from its said specified output characteristics.

21. The camera of claim 20 wherein said exposure brightness input is provided substantially over the entire course of said exposure cycle and said input responsive means effects adjustment of said flash mode trajectory curve on a substantially continuous basis.

22. The camera of claim 21 wherein said blade drive means includes a stepper motor and stepper motor drive circuit and each said program of trajectory signals comprises a series of pulse signals and said input responsive means effects adjustment of the resultant trajectory curve by regulating the timing at which said pulse signals are sequentially provided to said drive circuit.

23. The camera of claim 22 wherein said control means includes a digital microcomputer.

24. A method of photoflash photography employing a combustible filament photoflash lamp having light output characteristics which may deviate from specifications due to manufacturing variances and wherein a digital computer is used to facilitate control over scene illumination and film exposure, said method being carried out automatically with a camera of the type including a progressively variable aperture scanning blade mechanism for controlling transmission of image forming light rays from a scene to a film unit at a film plane, drive means responsive to a program of trajectory signals for driving said blade mechanism in a manner whereby its operation is characterized by an aperture size versus time trajectory curve defined by said trajectory signal program, means for providing pre-exposure inputs indicative of scene brightness and distance and an exposure brightness input indicative of scene brightness during the exposure cycle, a flash unit responsive to a flash fire signal for firing a photoflash lamp and a digital computer preprogrammed to control the operation of the camera and flash unit in accordance with the steps of this method and including a trajectory data base including data relating to at least characterizing elements of a plurality of different flash mode trajectories each correlated to a different combination of scene brightness and distance parameters and a flash fire data base indicating a corresponding flash firing time for each of said trajectories, said method comprising the steps of:

(1) actuating said camera to initiate an automatic cycle of operation, including a pre-exposure phase followed by a film exposure phase, under the control of said computer, during said pre-exposure phase:

(2) automatically providing said brightness and distance inputs to said computer;

(3) in accordance with said pre-exposure inputs utilizing said computer to develop at least characterizing elements of a correlated flash mode trajectory signal program from said trajectory data base and to select a corresponding flash firing time from said flash fire data base; and during the exposure cycle:

(4) automatically providing said exposure brightness input to said computer;

(5) feeding at least an initial portion of said trajectory signal program to said drive means for displacing said blade mechanism to define an opening portion of the developed trajectory curve;

(6) providing said flash fire signal at the selected time to fire said photoflash lamp; and (7) in response to said exposure brightness input, utilizing said computer to automatically regulate the provision of the trajectory program signals to said drive means for adjusting said trajectory curve to the light output characteristics of said flash lamp for optimum exposure value.

25. The method of claim 24 wherein said flash mode trajectory data base sets forth a peak aperture and a schedule of percentages of total exposure value to be achieved at various aperture values and said computer regulates the timing of the trajectory signals to said drive means so said blade mechanism is held at a particular aperture defining position until the specified predetermined percentage is achieved before the blade mechanism is displaced to the next scheduled aperture defining position.

26. The method of claim 25 wherein said drive means includes a stepper motor and stepper motor drive circuit and said computer varies the timing of sequential program signals to said drive circuit in accordance with said exposure brightness input to adjust the trajectory curve.

27. The method of claim 25 further including a proportional fill flash mode wherein the main portion of the trajectory is developed in accordance with the scene brightness parameter, the flash fire aperture is selected in accordance with camera-to-scene distance, and that portion of the trajectory that occurs following the firing of the photoflash lamp is adjusted on a hold and wait basis to compensate for deviations in the output characteristics of the photoflash lamp.

* * * * *